US011912041B2

(12) United States Patent
Vo

(10) Patent No.: US 11,912,041 B2
(45) Date of Patent: Feb. 27, 2024

(54) PRINTHEAD WITH INTERNAL PUMP AT FLUID MANIFOLD

(71) Applicant: Giang Vo, Simi Valley, CA (US)

(72) Inventor: Giang Vo, Simi Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 70 days.

(21) Appl. No.: 17/554,600

(22) Filed: Dec. 17, 2021

(65) Prior Publication Data

US 2023/0191792 A1 Jun. 22, 2023

(51) Int. Cl.

| | |
|---|---|
| ***B41J 2/175*** | (2006.01) |
| ***B41J 2/045*** | (2006.01) |
| ***B41J 2/14*** | (2006.01) |

(52) U.S. Cl.

CPC ....... *B41J 2/17596* (2013.01); *B41J 2/04581* (2013.01); *B41J 2/14233* (2013.01); *B41J 2002/14266* (2013.01); *B41J 2002/14306* (2013.01); *B41J 2002/14419* (2013.01)

(58) Field of Classification Search

CPC ................ B41J 2/17596; B41J 2/04581; B41J 2/14233; B41J 2002/14266; B41J 2002/14306; B41J 2002/14419

See application file for complete search history.

(56) References Cited

U.S. PATENT DOCUMENTS

| | | | |
|---|---|---|---|
| 5,764,258 A | 6/1998 | Hetzer et al. | |
| 5,933,170 A | 8/1999 | Takeuchi et al. | |
| 6,017,117 A | 1/2000 | McClelland et al. | |
| 6,299,295 B1 | 10/2001 | Miura et al. | |
| 8,042,913 B2 | 10/2011 | Nathan et al. | |
| 8,814,293 B2 | 8/2014 | Strunk et al. | |
| 8,939,531 B2 | 1/2015 | Govyadinov et al. | |
| 2004/0113991 A1 | 6/2004 | Slotto et al. | |
| 2020/0198329 A1 | 6/2020 | Sugai | |
| 2021/0062025 A1 | 3/2021 | Harvey et al. | |
| 2021/0155006 A1* | 5/2021 | Wang | B41J 2/18 |

FOREIGN PATENT DOCUMENTS

| | | |
|---|---|---|
| CN | 105128532 B | 1/2017 |

OTHER PUBLICATIONS

Andrew Wilson; Applying vision to nozzle-plate analysis; VisionSystemsDesign; Aug. 1, 2002.

* cited by examiner

*Primary Examiner* — Lisa Solomon

(74) *Attorney, Agent, or Firm* — Duft & Bornsen, PC

(57) ABSTRACT

Printheads and a method of operating a printhead. In one embodiment, a printhead comprises a plurality of jetting channels, a manifold internal to the printhead that is configured to convey a print fluid from an inlet of the printhead to the jetting channels, and an internal pump disposed at the manifold. The internal pump is configured to draw the print fluid into the manifold through the inlet, and to discharge the print fluid from the manifold to the jetting channels.

20 Claims, 17 Drawing Sheets

PRINTHEAD WITH INTERNAL PUMP AT FLUID MANIFOLD

TECHNICAL FIELD

The following disclosure relates to the field of image formation, and in particular, to printheads and the operation of printheads.

BACKGROUND

Image formation is a procedure whereby a digital image is recreated by propelling droplets of ink or another type of print fluid onto a medium, such as paper, plastic, a substrate for 3D printing, etc. Image formation is commonly employed in apparatuses, such as printers (e.g., inkjet printer), facsimile machines, copying machines, plotting machines, multifunction peripherals, etc. The core of a typical jetting apparatus or image forming apparatus is one or more liquid-droplet ejection heads (referred to generally herein as "printheads") having nozzles that discharge liquid droplets, a mechanism for moving the printhead and/or the medium in relation to one another, and a controller that controls how liquid is discharged from the individual nozzles of the printhead onto the medium in the form of pixels.

A typical printhead includes a plurality of nozzles aligned in one or more rows along a discharge surface of the printhead. Each nozzle is part of a "jetting channel", which includes the nozzle, a pressure chamber, and a diaphragm that vibrates in response to an actuator, such as a piezoelectric actuator. A printhead also includes a driver circuit that controls when each individual jetting channel fires based on image or print data. To jet from a jetting channel, the driver circuit provides a jetting pulse to the actuator, which causes the actuator to deform a wall of the pressure chamber (i.e., the diaphragm). The deformation of the pressure chamber creates pressure waves within the pressure chamber that eject a droplet of print fluid (e.g., ink) out of the nozzle.

Presently, an external delivery system may be used to supply print fluid to a printhead. For a non-flow-through type of printhead, for example, an external pump may be used to convey print fluid from a supply reservoir to the printhead. For a flow-through type of printhead, an external pump may be used on the supply side (i.e., positive pressure side) and an external (or vacuum) pump may be used on the return side (i.e., negative pressure side) to convey print fluid through the printhead, while maintaining a slightly negative pressure at the nozzles to prevent weeping of print fluid through the nozzles. However, external delivery systems can be complex and expensive, and can take up valuable space within a jetting apparatus.

SUMMARY

Embodiments described herein provide for one or more internal pumps that are embedded in a printhead. For a non-flow-through type of printhead, for example, an internal pump is embedded in a fluid or flow path of print fluid between an inlet and the jetting channels. Thus, the printhead provides its own pumping power to move the print fluid from the inlet to the jetting channels. For a flow-through type of printhead, for example, an internal pump is embedded in a fluid or flow path of print fluid between an inlet and the jetting channels, and an internal pump is embedded in a fluid path of print fluid between the jetting channels and an outlet. Thus, the printhead provides its own pumping power to move the print fluid from the inlet, through the jetting channels, and out through the outlet. One technical benefit is a printhead can regulate its own flow characteristics of print fluid within the printhead. Another technical benefit is that a complex and expensive external delivery system can be eliminated when using this type of printhead.

In one embodiment, a printhead comprises a plurality of jetting channels, a first manifold internal to the printhead that is configured to convey a print fluid from an inlet of the printhead to the jetting channels, and a first internal pump disposed at the first manifold. The first internal pump is configured to draw the print fluid into the first manifold through the inlet, and to discharge the print fluid from the first manifold to the jetting channels.

In one embodiment, a printhead comprises a plurality of jetting channels, and a first manifold and a second manifold internal to the printhead. The first manifold defines a first fluid path between an inlet of the printhead and the jetting channels, and the second manifold defines a second fluid path between the jetting channels and an outlet of the printhead. The printhead further comprising a first internal pump disposed in the first fluid path between the inlet and the jetting channels, and a second internal pump disposed in the second fluid path between the jetting channels and the outlet.

In one embodiment, a method of operating a printhead comprises controlling a first internal pump within the printhead, where the printhead comprises a plurality of jetting channels, a first manifold internal to the printhead configured to convey a print fluid from an inlet of the printhead to the jetting channels, and the first internal pump disposed at the first manifold. Controlling the first internal pump comprises controlling the first internal pump to draw the print fluid into the first manifold through the inlet, and controlling the first internal pump to discharge the print fluid from the first manifold to the jetting channels.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
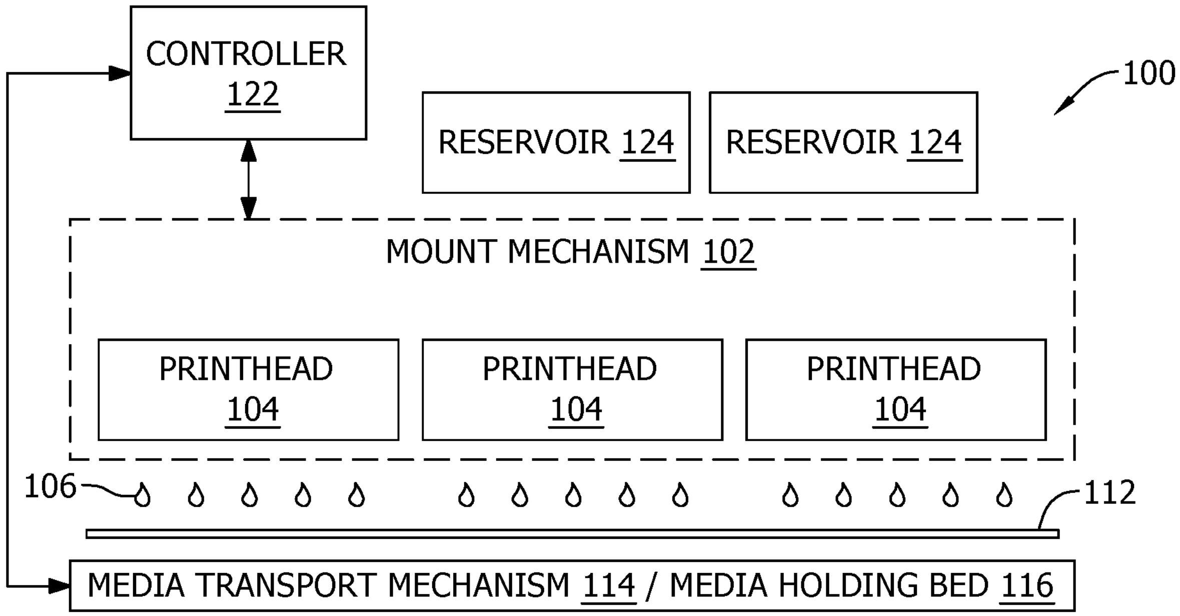
FIG. 1 is a schematic diagram of a jetting apparatus in an illustrative embodiment.

FIG. 1 is a schematic diagram of a jetting apparatus 100 in an illustrative embodiment. A jetting apparatus 100 is a device or system that uses one or more printheads to eject a print fluid or marking material onto a medium. One example of jetting apparatus 100 is an inkjet printer (e.g., a cut-sheet or continuous-feed printer) that performs single-pass printing. Other examples of jetting apparatus 100 include a scan pass inkjet printer (e.g., a wide format printer), a multifunction printer, a desktop printer, an industrial printer, a 3D printer, etc. Generally, jetting apparatus 100 includes a mount mechanism 102 that supports one or more printheads 104 in relation to a medium 112. Mount mechanism 102 may be fixed within jetting apparatus 100 for single-pass printing. Alternatively, mount mechanism 102 may be disposed on a carriage assembly that reciprocates back and forth along a scan line or sub-scan direction for multi-pass printing. Printheads 104 are a device, apparatus, or component configured to eject droplets 106 of a print fluid, such as ink (e.g., water, solvent, oil, or UV-curable), through a plurality of nozzles (not visible in FIG. 1). The droplets 106 ejected from the nozzles of printheads 104 are directed toward medium 112. Medium 112 comprises any type of material upon which ink or another print or jetting fluid is applied by a printhead, such as paper, plastic, card stock, transparent sheets, a substrate for 3D printing, cloth, etc. Typically, nozzles of printheads 104 are arranged in one or more rows so that ejection of a print fluid from the nozzles causes formation of characters, symbols, images, layers of an object, etc., on medium 112 as printhead 104 and/or medium 112 are moved relative to one another. Jetting apparatus 100 may include a media transport mechanism 114 or a media holding bed 116. Media transport mechanism 114 is configured to move medium 112 relative to printheads 104. Media holding bed 116 is configured to support medium 112 in a stationary position while the printheads 104 move in relation to medium 112.

Jetting apparatus 100 also includes a jetting apparatus controller 122 that controls the overall operation of jetting apparatus 100. Jetting apparatus controller 122 may connect to a data source to receive print data, image data, or the like, and control each printhead 104 to discharge the print fluid on medium 112. Jetting apparatus 100 also includes one or more reservoirs 124 for a print fluid or multiple types of print fluid. Although not shown in FIG. 1, reservoirs 124 are fluidly coupled to printheads 104, such as with hoses, tubes, or the like.

Figure 2:
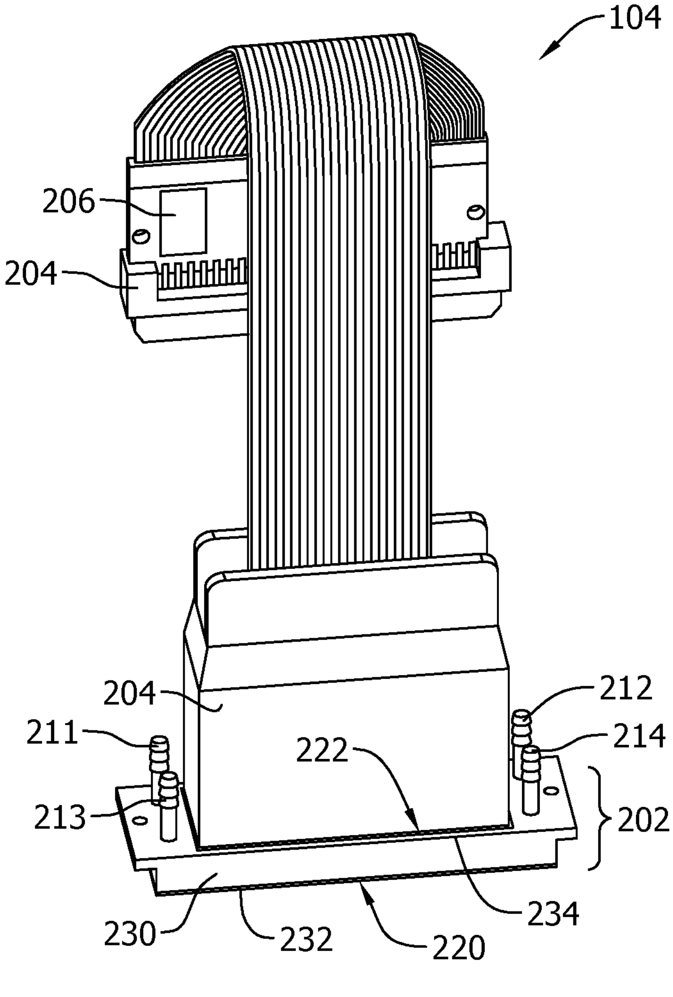
FIG. 2 is a perspective view of a printhead in an illustrative embodiment.

FIG. 2 is a perspective view of a printhead 104 in an illustrative embodiment. In this embodiment, printhead 104 includes a head member 202 and electronics 204. Head member 202 is an elongated component that forms the jetting channels of printhead 104. A typical jetting channel includes a nozzle, a pressure chamber, and a diaphragm that is driven by an actuator, such as a piezoelectric actuator. Electronics 204 control how the nozzles of printhead 104 jet droplets in response to data signals and control signals received from another controller (e.g., jetting apparatus controller 122). Electronics 204 include an embedded printhead controller 206 or driver circuits configured to drive individual jetting channels based on the data signals and control signals. Printhead controller 206 may also be configured to drive one or more internal pumps as described in more detail below.

The bottom surface of head member 202 in FIG. 2 includes the nozzles of the jetting channels, and represents the discharge surface 220 of printhead 104. The top surface of head member 202 in FIG. 2 (referred to as I/O surface 222) represents the Input/Output (I/O) portion for receiving one or more print fluids into printhead 104, and/or conveying print fluids (e.g., fluids that are not jetted) out of printhead 104. I/O surface 222 includes a plurality of I/O ports 211-214. An I/O port 211-214 may comprise an inlet I/O port, which is an opening in head member 202 that acts as an inlet or entry point for a print fluid. An I/O port 211-214 may comprise an outlet I/O port, which is an opening in head member 202 that acts as an outlet or exit point for a print fluid. I/O ports 211-214 may include a hose coupling, hose barb, etc., for coupling with a hose of a reservoir, a cartridge, or the like. The number of I/O ports 211-214 is provided as an example, as printhead 104 may include other numbers of I/O ports.

Head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with (i.e., come into contact with) diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack. Plate stack 232 may include the following plates: one or more nozzle plates, one or more chamber plates, one or more restrictor plates, and a diaphragm plate. A nozzle plate includes a plurality of nozzles that are arranged in one or more rows (e.g., two rows, four rows, etc.). A chamber plate includes a plurality of openings that form the pressure chambers of the jetting channels. A restrictor plate includes a plurality of restrictors that fluidly couple the pressure chambers of the jetting channels with a manifold. A diaphragm plate is a sheet of a semi-flexible material that vibrates in response to actuation by an actuator (e.g., piezoelectric actuator).

The embodiment in FIG. 2 illustrates one particular configuration of a printhead 104, and it is understood that other printhead configurations are considered herein that have a plurality of jetting channels.

Figure 3:
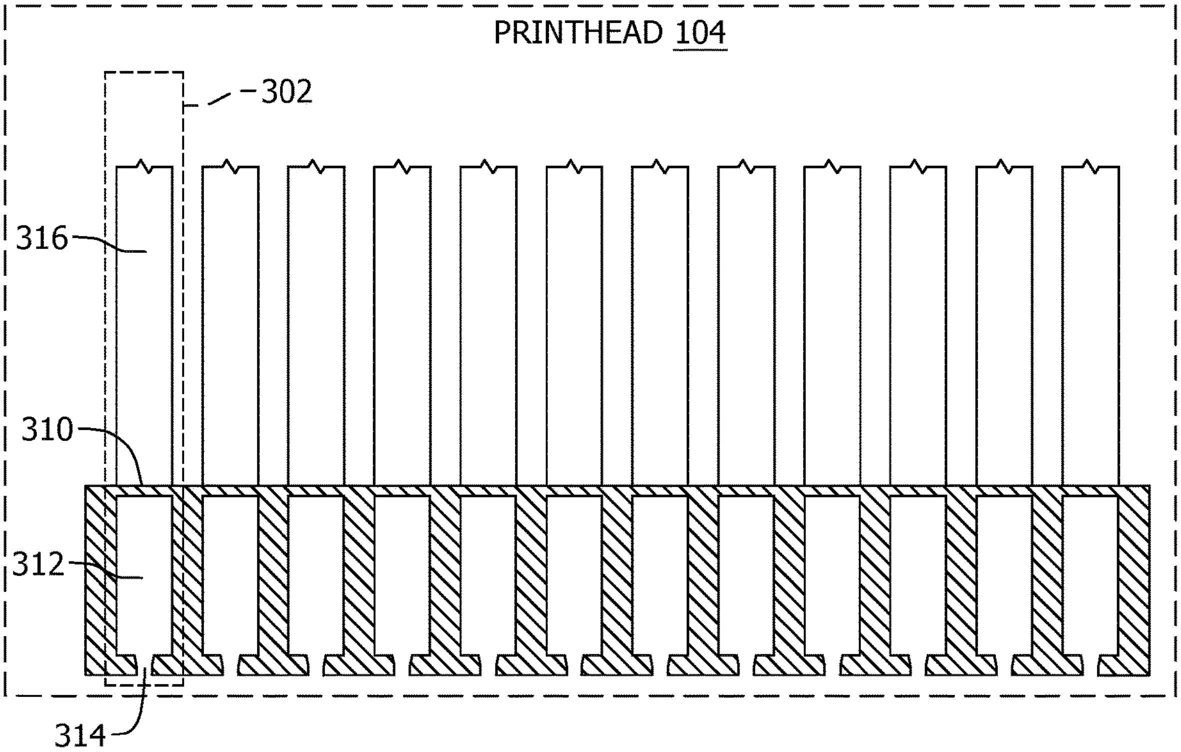
FIG. 3 is a cross-sectional view of a printhead in an illustrative embodiment.

FIG. 3 is a cross-sectional view of printhead 104 in an illustrative embodiment. This diagram represents a view along a length of printhead 104. A jetting channel 302 is a structural element within printhead 104 that jets or ejects a print fluid. Each jetting channel 302 includes a diaphragm 310, a pressure chamber 312, and a nozzle 314. An actuator 316 contacts diaphragm 310 to control jetting from a jetting channel 302. Jetting channels 302 may be formed in one or more rows along a length of printhead 104, and each jetting channel 302 may have a similar configuration as shown in FIG. 3.

Figure 4:
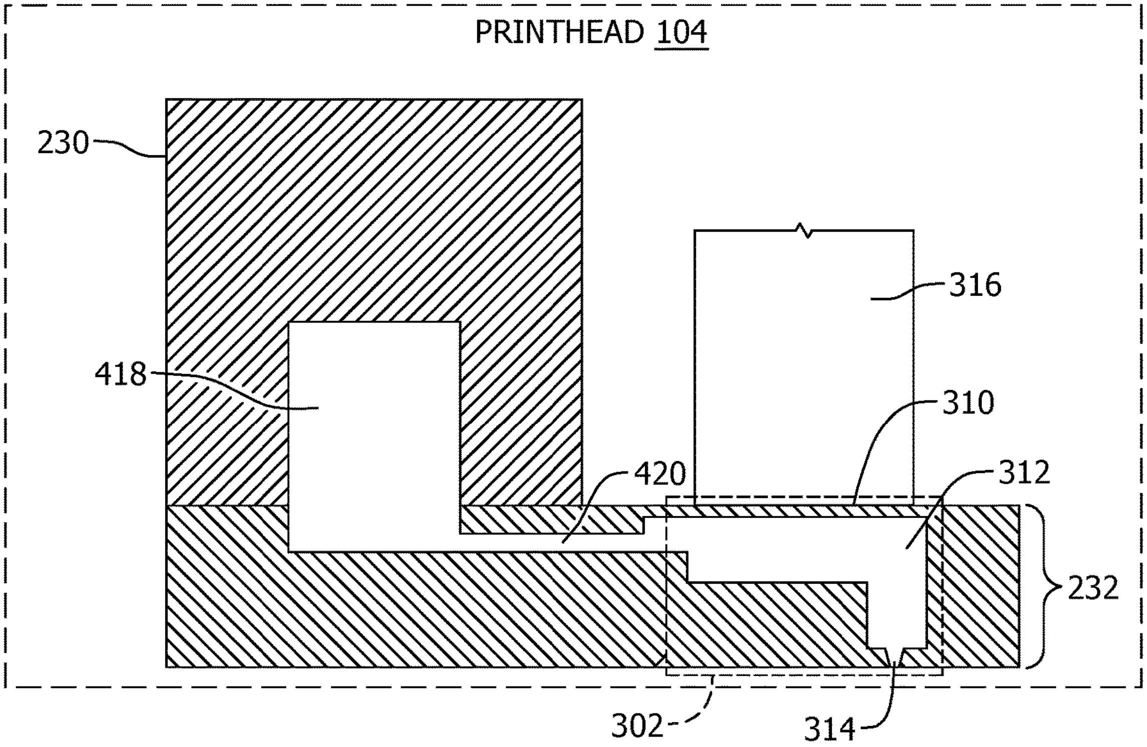
FIG. 4 is another cross-sectional view of a portion of a printhead in an illustrative embodiment.

FIG. 4 is another cross-sectional view of a portion of printhead 104 in an illustrative embodiment. The view in FIG. 4 is of a cross-section across a width of a portion of printhead 104. As in FIG. 3, jetting channel 302 includes diaphragm 310, pressure chamber 312, and nozzle 314. Pressure chamber 312 is fluidly coupled to a manifold 418 through a restrictor 420. Restrictor 420 controls the flow of the print fluid from manifold 418 to pressure chamber 312. One wall of pressure chamber 312 is formed with diaphragm 310 that physically interfaces with actuator 316. Diaphragm 310 may comprise a sheet of semi-flexible material that vibrates in response to actuation by actuator 316. The print fluid flows through pressure chamber 312 and out of nozzle 314 in the form of a droplet in response to actuation by actuator 316. Actuator 316 is configured to receive a jetting pulse, and to actuate or "fire" in response to the jetting pulse. Firing of actuator 316 in jetting channel 302 creates pressure waves in pressure chamber 312 that cause jetting of a droplet from nozzle 314.

A jetting channel 302 as shown in FIGS. 3-4 is an example to illustrate a basic structure of a jetting channel, such as the diaphragm, pressure chamber, and nozzle. Other types of jetting channels are also considered herein. For example, some jetting channels may have a pressure chamber having a different shape than is illustrated in FIGS. 3-4. Also, the position of a manifold 418, a restrictor 420, a diaphragm 310, etc., may differ in other embodiments.

Figure 5:
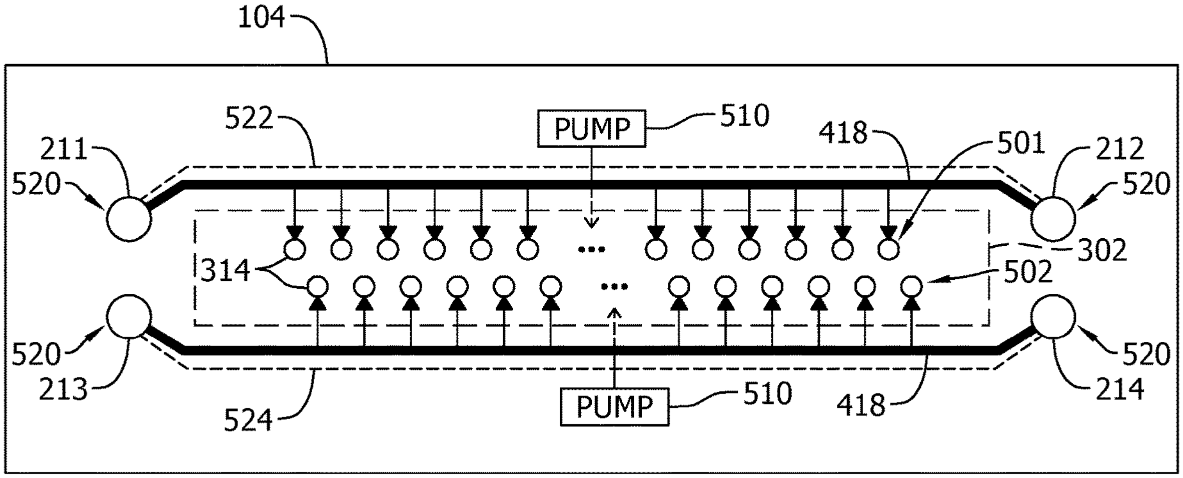
FIG. 5 is a schematic diagram of a printhead in an illustrative embodiment.

FIG. 5 is a schematic diagram of a printhead 104 in an illustrative embodiment. The jetting channels 302 of printhead 104 are schematically illustrated in FIG. 5 as nozzles 314 in two nozzle rows 501-502. Although the nozzles 314 are shown as staggered in FIG. 5, the nozzles 314 in the nozzle rows 501-502 may be aligned in other embodiments. Also, although two nozzle rows 501-502 are illustrated in FIG. 5, printhead 104 may include more or less nozzle rows in other embodiments.

Printhead 104 (i.e., head member 202) includes a plurality of manifolds 418. A manifold 418 is a conduit or channel internal to printhead 104 (i.e., within the main body or housing 230 of printhead 104) that provides a common fluid path for a plurality of jetting channels 302. A manifold 418 that conveys a print fluid to a plurality of jetting channels 302 may also be referred to as a "supply" manifold. I/O ports 211-212 define inlets 520 of print fluid into printhead 104. One of the manifolds 418 comprises or defines a fluid path 522 between I/O ports 211-212 and the jetting channels 302 in nozzle row 501. Thus, manifold 418 is configured to convey a print fluid from an inlet 520 (or inlets) of printhead 104 (i.e., I/O port 211 and/or I/O port 212) to the jetting channels 302 in nozzle row 501. A manifold 418 that conveys a print fluid to jetting channels 302 may be considered as having a direct fluid coupling with the jetting channels 302, as the manifold 418 is fluidly coupled through a restrictor or similar element that controls the flow of the print fluid from manifold 418 to a jetting channel 302. Another one of the manifolds 418 comprises or defines a fluid path 524 between I/O ports 213-214 and the jetting channels 302 in nozzle row 502. Thus, manifold 418 is configured to convey a print fluid from an inlet 520 (or inlets) of printhead 104 (i.e., I/O port 213 and/or I/O port 214) to the jetting channels 302 in nozzle row 502. The major portions or sections of manifolds 418 are disposed longitudinally within printhead 104 to fluidly couple with the jetting channels 302. Although two manifolds 418 are illustrated in FIG. 5, a printhead 104 may include more or less manifolds as desired.

In this embodiment, an internal pump 510 is disposed or implemented at manifolds 418. An internal pump 510 is a device internal to or embedded in a printhead (e.g., within the main body or housing 230 of printhead 104), that is configured to move or convey a print fluid through a manifold by mechanical action. An internal pump 510 may also be referred to as a micro pump, an integrated pump, a manifold pump, etc. In FIG. 5, one of the manifolds 418 defines a fluid path 522 between I/O ports 211-212 and the jetting channels 302 in nozzle row 501. Thus, an internal pump 510 is disposed in the fluid path 522 between I/O ports 211-212 and the jetting channels 302 in nozzle row 501 to move a print fluid from entry points (i.e., I/O ports 211-212) of printhead 104 to those jetting channels 302. Likewise, another one of the manifolds 418 defines a fluid path 524 between I/O ports 213-214 and the jetting channels 302 in nozzle row 502. Thus, an internal pump 510 is disposed in the fluid path 524 between I/O ports 213-214 and the jetting channels 302 in nozzle row 502 to move a print fluid from entry points (i.e., I/O ports 213-214) of printhead 104 to those jetting channels 302. Although not shown in FIG. 5, one or more valves may be implemented or disposed in manifolds 418 between inlets 520 and internal pump 510. A valve comprises a structural element that restricts a backward flow of print fluid, such as a ball valve, a one-way flapper valve, a diffuser, etc. Also, a valve may be implemented between manifold 418 and each of the jetting channels 302 (i.e., in the fluid path between manifold 418 and each of the jetting channels 302).

Figure 6:
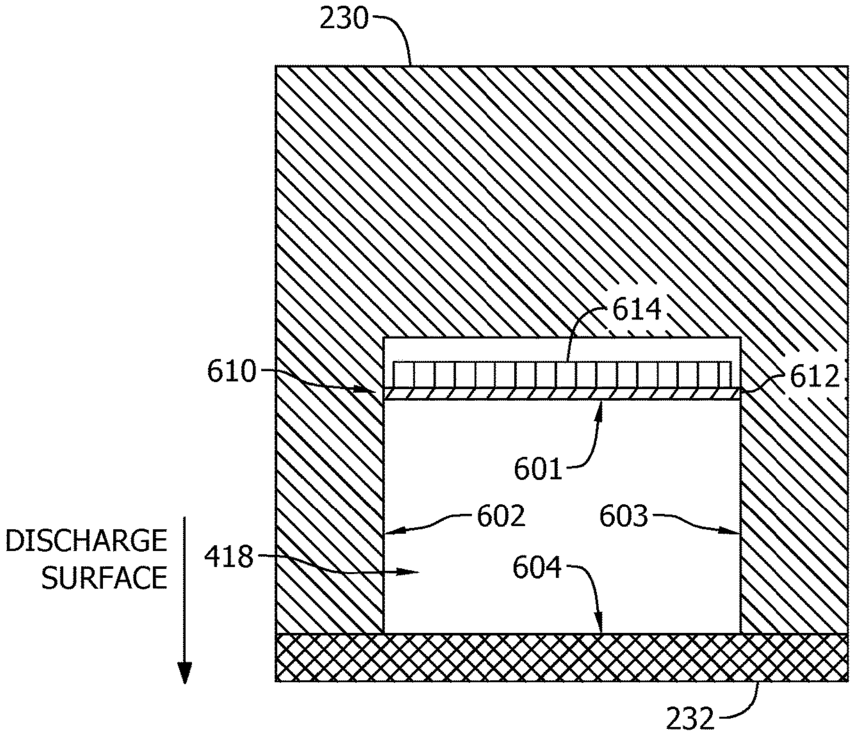
FIG. 6 illustrates a cross-sectional view of a manifold in an illustrative embodiment.

In one embodiment, internal pump 510 may comprise a positive-displacement pump, such as a piezoelectric pump. FIG. 6 illustrates a cross-sectional view of a manifold 418 in an illustrative embodiment. The view of manifold 418 in FIG. 6 is along a transverse cut-plane of printhead 104, which is transverse to a row 501-502 of jetting channels 302. The downward direction in FIG. 6 is toward the discharge surface 220 (or nozzles 314) of printhead 104. A manifold (shown as manifold 418) includes a plurality of walls 601-604 that form a conduit or channel that conveys a print fluid to jetting channels 302. More particularly, manifold 418 includes top wall 601 (e.g., opposite and/or parallel to the plate stack 232) and side walls 602-603 (e.g., perpendicular to the plate stack 232) defined by housing 230, and includes bottom wall 604 defined by plate stack 232. In this embodiment, a positive-displacement pump 610 is embedded in housing 230 and disposed at manifold 418. Positive-displacement pump 610 includes a pump diaphragm 612 that defines a wall 601 of manifold 418. Pump diaphragm 612 comprises sheet of a semi-flexible material that vibrates in response to actuation by an actuator. Pump diaphragm 612 may extend along the longitudinal length of manifold 418 (i.e., into and out of the page of FIG. 6). Positive-displacement pump 610 also includes an actuator 614 that contacts pump diaphragm 612, and is configured to impart movement to or displace the pump diaphragm 612 in response to control signals provided by electronics 204 (e.g., embedded printhead controller 206). Pump diaphragm 612 is illustrated as defining a top wall (i.e., wall 601) of manifold 418 in this embodiment. In one embodiment, pump diaphragm 612 may define a side wall 602-603 of manifold 418. In one embodiment, a positive-displacement pump 610 may be embedded in plate stack 232, and pump diaphragm 612 may define bottom wall 604 of manifold 418. In one embodiment, there may be multiple positive-displacement pumps 610, where multiple walls 601-604 of manifold 418 are defined by a pump diaphragm 612 of a positive-displacement pump 610. Other manifolds described herein may have a similar structure of a plurality of walls 601-604 that form a conduit or channel that conveys a print fluid.

Although shown as a positive-displacement pump in FIG. 6, internal pump 510 may be another type of pump in other embodiments.

Figure 7:
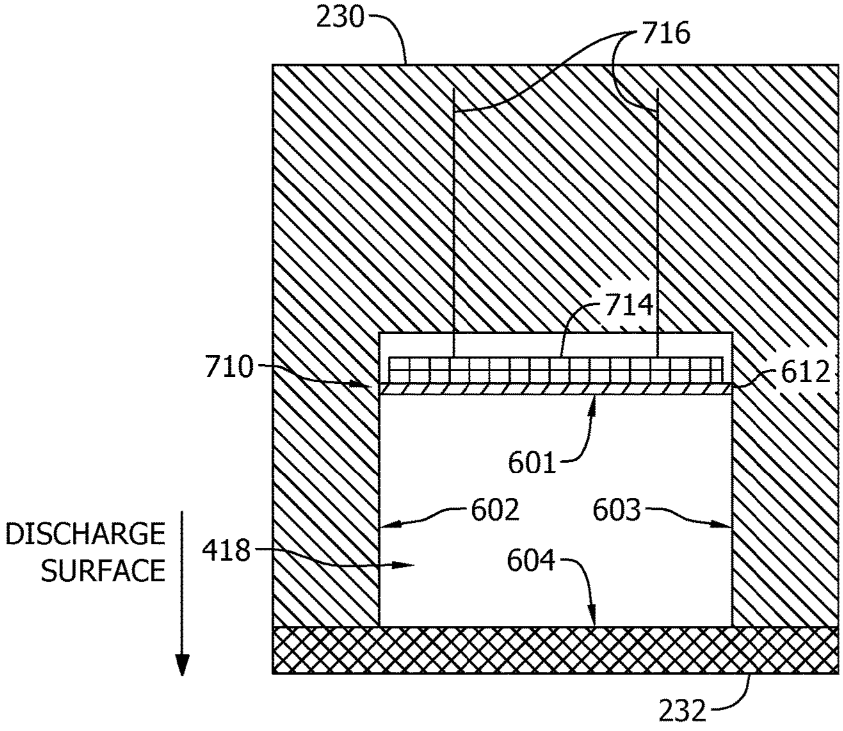
FIG. 7 illustrates another cross-sectional view of a manifold in an illustrative embodiment.

In one embodiment, positive-displacement pump 610 as in FIG. 6 may comprise a piezoelectric pump. FIG. 7 illustrates another cross-sectional view of a manifold 418 in an illustrative embodiment. In this embodiment, a piezoelectric pump 710 is disposed at manifold 418. Piezoelectric pump 710 includes a pump diaphragm 612 that defines a wall 601 of manifold 418, and a piezoelectric actuator (PZT) 714 or piezoelectric plate that contacts pump diaphragm 612. Piezoelectric actuator 714 is a transducer that converts electrical energy into a mechanical displacement or stress based on a piezoelectric effect. Thus, piezoelectric actuator 714 is configured to impart movement to, or displace, the pump diaphragm 612. Also shown are electrical leads 716 that are embedded within printhead 104, and are configured to carry control signals provided by electronics 204 (e.g., printhead controller 206), which drive piezoelectric actuator 714.

Figure 8:
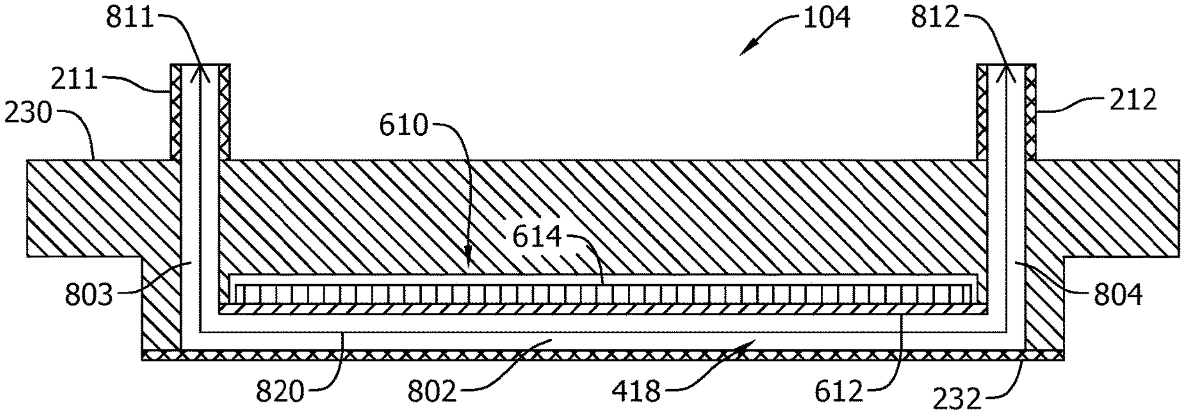
FIG. 8 is a cross-sectional view of a printhead in an illustrative embodiment.

FIG. 8 is a cross-sectional view of printhead 104 in an illustrative embodiment. The cross-section shown in FIG. 8 is along a longitudinal cut-plane through printhead 104. In this embodiment, manifold 418 includes a longitudinal section 802 that is generally disposed longitudinally within printhead 104 along a row of jetting channels 302, and fluidly coupled to the jetting channels 302. Manifold 418 also includes transverse sections 803-804 that are generally disposed transversely within printhead 104 between longitudinal section 802 and open ends 811-812, respectively. The length 820 of manifold 418 may therefore be defined as the length of a fluid path between open end 811 and open end 812. In this embodiment, positive-displacement pump 610 is disposed along longitudinal section 802 of manifold 418. Thus, pump diaphragm 612 of positive-displacement pump 610 defines a wall 601-604 of manifold 418 along longitudinal section 802, which is the top wall 601 in this embodiment (see also, FIG. 6). Pump diaphragm 612 may extend along the entire length of longitudinal section 802 as shown in FIG. 8, or a portion of the length of longitudinal section 802. Although pump diaphragm 612 is illustrated as defining a top wall 601 of manifold 418 in FIG. 8, pump diaphragm 612 may define a side wall 602-603 or bottom wall 604 in other embodiments.

Figure 9:
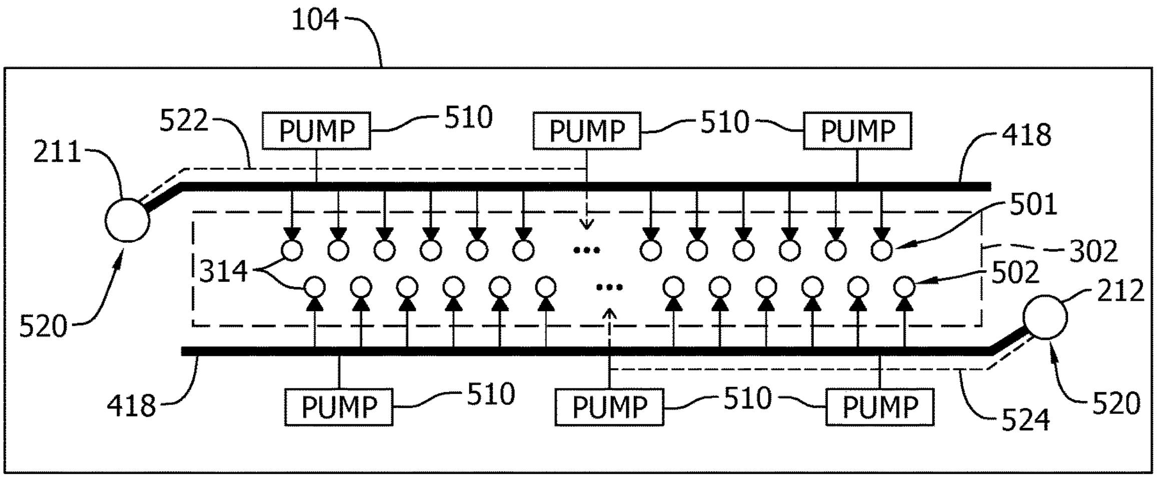
FIG. 9 is another schematic diagram of a printhead in an illustrative embodiment.

In the above embodiments, printhead 104 is shown as including two manifolds 418. However, printhead 104 may include more or less manifolds 418 in other embodiments. And, the manifolds 418 of printhead 104 may each include one or more internal pumps 510 as described above. Also, printhead 104 is shown as including four I/O ports 211-214. However, printhead 104 may include more or less I/O ports 211-214 in other embodiments. For example, FIG. 9 is another schematic diagram of a printhead 104 in an illustrative embodiment. In this embodiment, a single I/O port 211-212 is fluidly coupled to each manifold 418, which is referred to as a one-sided or dead-ended manifold. One of the manifolds 418 comprises or defines a fluid path 522 between I/O port 211 and the jetting channels 302 in nozzle row 501. Thus, manifold 418 is configured to convey a print fluid from an inlet 520 of printhead 104 (i.e., I/O port 211) to the jetting channels 302 in nozzle row 501. Another one of the manifolds 418 comprises or defines a fluid path 524 between I/O port 212 and the jetting channels 302 in nozzle row 502. Thus, manifold 418 is configured to convey a print fluid from an inlet 520 of printhead 104 (i.e., I/O port 212) to the jetting channels 302 in nozzle row 502.

In this embodiment, a plurality of internal pumps 510 are disposed or implemented at manifolds 418. In FIG. 9, one of the manifolds 418 defines fluid path 522 between I/O port 211 and the jetting channels 302 in nozzle row 501. Because manifold 418 is dead-ended, there may be a pressure differential along the length of manifold 418. Thus, multiple internal pumps 510 are disposed in the fluid path 522 between I/O port 211 and the jetting channels 302 in nozzle row 501 to move a print fluid from an entry point (i.e., I/O port 211) of printhead 104 to those jetting channels 302. The internal pumps 510 may be controlled individually via control signals provided by electronics 204 (e.g., printhead controller 206) to address the pressure differential along manifold 418. Likewise, another one of the manifolds 418 defines fluid path 524 between I/O port 212 and the jetting channels 302 in nozzle row 502. Multiple internal pumps 510 are disposed in the fluid path 524 between I/O port 212 and the jetting channels 302 in nozzle row 502 to move a print fluid from an entry point (i.e., I/O ports 212) of printhead 104 to those jetting channels 302.

Figure 10:
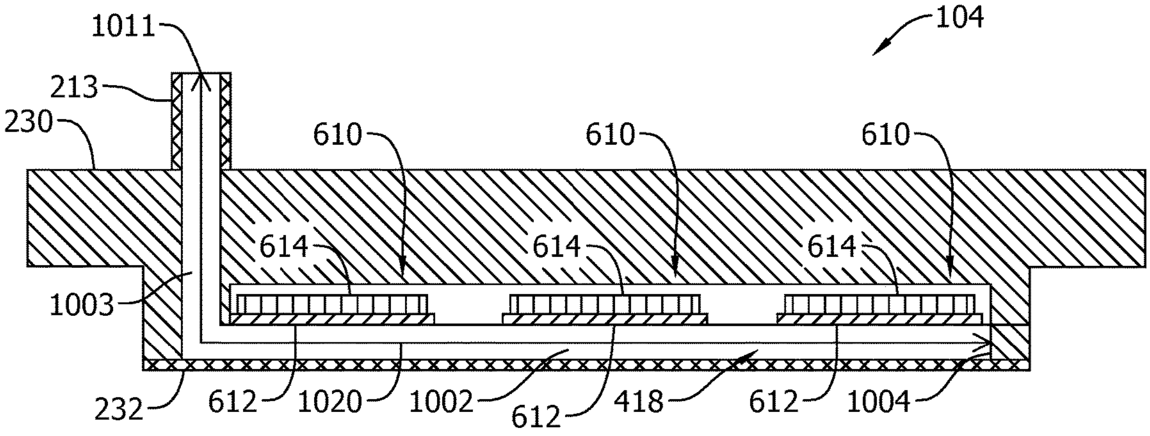
FIG. 10 is another cross-sectional view of a printhead in an illustrative embodiment.

FIG. 10 is another cross-sectional view of printhead 104 in an illustrative embodiment. The cross-section shown in FIG. 10 is along a longitudinal cut-plane through printhead 104. In this embodiment, manifold 418 includes a longitudinal section 1002 that is generally disposed longitudinally within printhead 104 along a row of jetting channels 302, and fluidly coupled to the jetting channels 302. Manifold 418 also includes a transverse section 1003 that is generally disposed transversely within printhead 104 between longitudinal section 1002 and open end 1011. The length 1020 of manifold 418 may therefore be defined as the length of a fluid path between open end 1011 and closed end 1004. Positive-displacement pumps 610 are disposed along longitudinal section 1002 of manifold 418. Thus, pump diaphragm 612 of each positive-displacement pump 610 defines a portion of a wall 601-604 of manifold 418 along longitudinal section 1002, which is the top wall 601 in this embodiment (see FIG. 6). Although pump diaphragms 612 are illustrated as defining a portion of a top wall 601 of manifold 418 in FIG. 10, pump diaphragms 612 may define a portion of a side wall 602-603 or bottom wall 604 in other embodiments.

Figure 11:
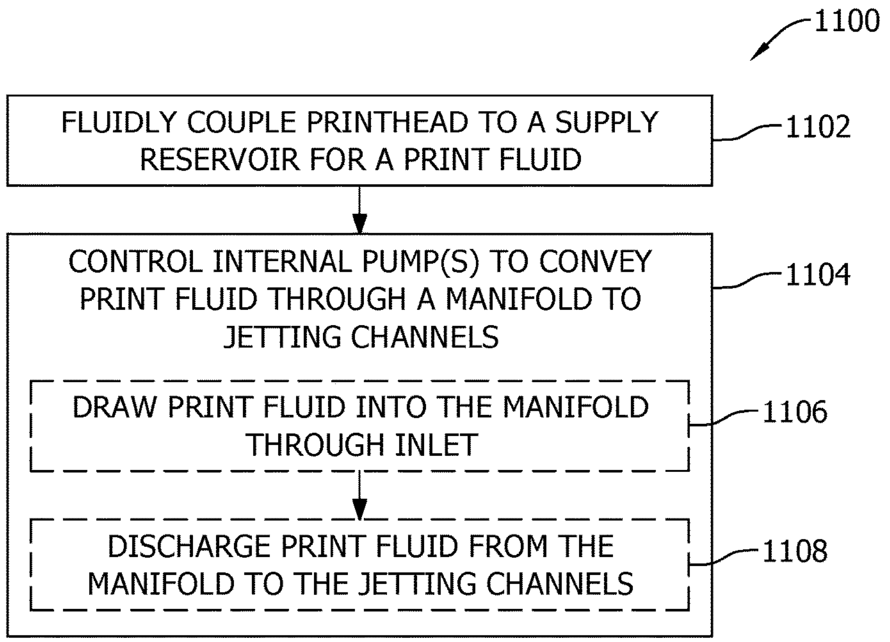
FIG. 11 is a flow chart illustrating a method of operating a printhead in an illustrative embodiment.

FIG. 11 is a flow chart illustrating a method 1100 of operating a printhead 104 in an illustrative embodiment. The steps of method 1100 will be described with reference to a printhead 104 as discussed in FIGS. 3-10, but those skilled in the art will appreciate that method 1100 may be performed in other printheads. Also, the steps of the flow charts described herein are not all inclusive and may include other steps not shown, and the steps may be performed in an alternative order.

Printhead 104 is fluidly coupled to a supply reservoir for a print fluid (step 1102). A supply reservoir (e.g., one of reservoirs 124 in FIG. 1) comprises a supply tank, a supply cartridge, or the like that contains a print fluid to be jetted by printhead 104. For example, I/O ports 211-212 of printhead 104 as in FIG. 5 may be coupled to the supply reservoir with a hose, tube, etc. In another example, I/O port 211 of printhead 104 as in FIG. 9 may be coupled to the supply reservoir with a hose, tube, etc. If printhead 104 is configured to jet different types of print fluids, then printhead 104 may be fluidly coupled to multiple reservoirs.

An internal pump 510 (or multiple internal pumps 510) within printhead 104 is controlled (step 1104) to convey the print fluid through the manifold 418. More particularly, the internal pump(s) 510 is controlled to draw the print fluid into manifold 418 through inlet 520 from a supply reservoir (step 1106). The internal pump(s) 510 is then controlled to discharge the print fluid from the manifold 418 to the jetting channels 302 (step 1108) that are fluidly coupled to the manifold 418. A valve, if implemented between an inlet 520 and internal pump 510, may act to restrict a backward flow of print fluid that is drawn into manifold 418 through inlet 520. A valve, if implemented between manifold 418 and a jetting channel 302, may act to restrict a backward flow of print fluid discharged from the manifold 418 to the jetting channel 302. Internal pump(s) 510 may be controlled or driven by controller 122 as shown in FIG. 1, printhead controller 206 as shown in FIG. 2, or another type of controller.

Method 1100 provides a technical benefit in that operation of an internal pump 510 provides sufficient suction to draw print fluid into an inlet 520 of printhead 104 from a supply reservoir, and to supply the print fluid to the jetting channels 302. Thus, a complex and expensive external delivery system is not needed to deliver print fluid to printhead 104. Also, internal pump 510 can regulate the flow characteristics of print fluid into and through printhead 104.

Figure 12:
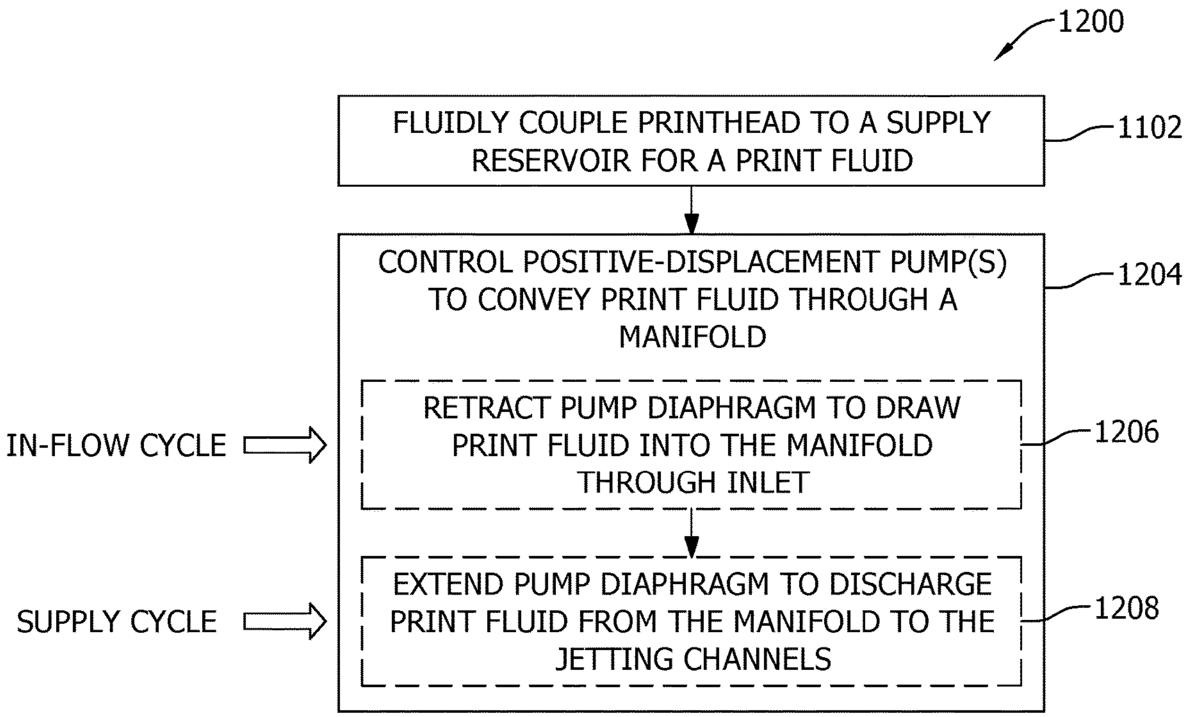
FIG. 12 is a flow chart illustrating another method of operating a printhead in an illustrative embodiment.
Figure 13:
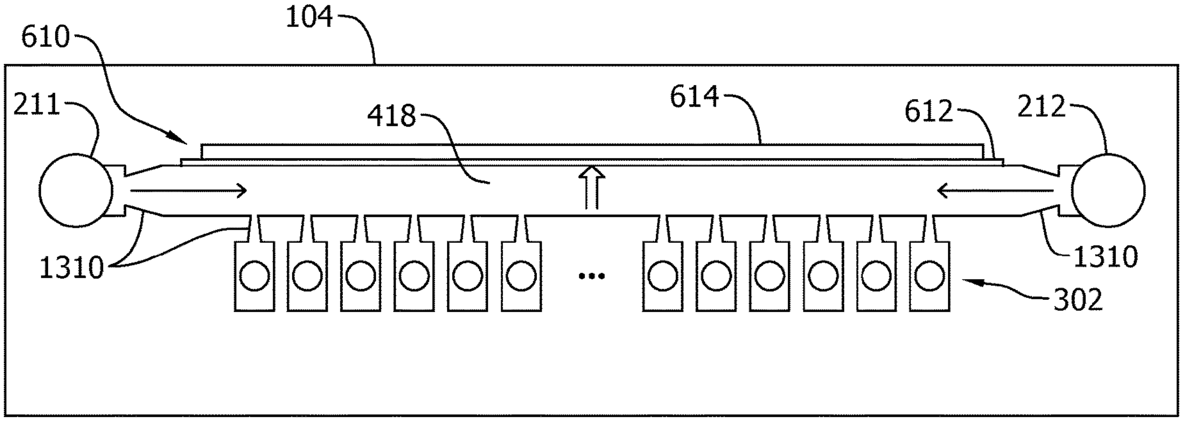
FIGS. 13-14 are schematic diagrams of a printhead with a positive-displacement pump in an illustrative embodiment.
Figure 14:
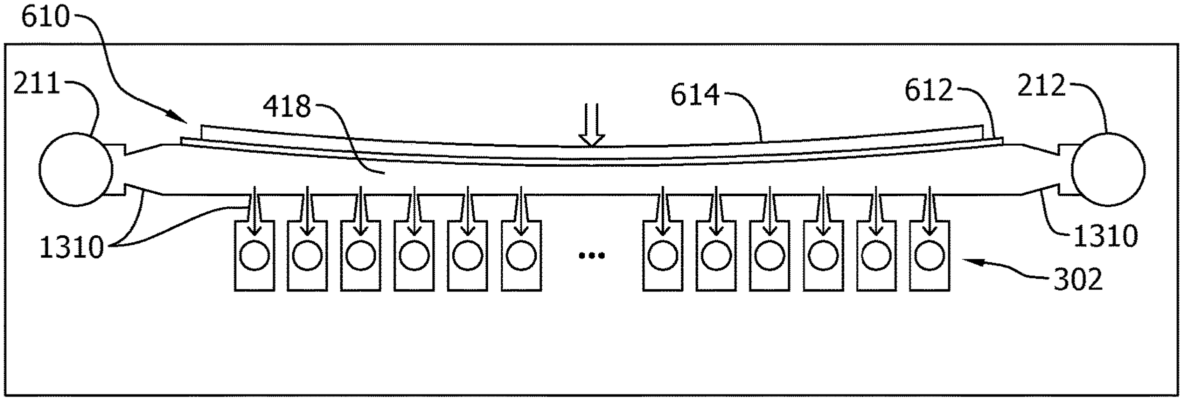

FIG. 12 is a flow chart illustrating another method 1200 of operating a printhead 104 in an illustrative embodiment. In this embodiment, the internal pump(s) 510 of printhead 104 comprises a positive-displacement pump 610 as shown in FIG. 6. As before, the printhead 104 is fluidly coupled to a supply reservoir for a print fluid (step 1102), and a positive-displacement pump 610 (or multiple positive-displacement pumps) within printhead 104 is controlled (step 1204) to convey the print fluid through the manifold 418. Control of a positive-displacement pump 610 is described as pump cycles. One pump cycle provides an in-flow of print fluid into manifold 418 from the supply reservoir. For the in-flow cycle, actuator 614 of the positive-displacement pump 610 is controlled to retract the pump diaphragm 612 (step 1206), which draws print fluid into manifold 418 through inlet 520 from the supply reservoir (as in step 1106 of FIG. 11). FIG. 13 is a schematic diagram of printhead 104 with a positive-displacement pump 610 in an illustrative embodiment. FIG. 13 shows a manifold 418 fluidly coupled to a row of jetting channels 302. Positive-displacement pump 610 includes a pump diaphragm 612 that defines a wall 601-604 of manifold 418, and an actuator 614 (e.g., PZT actuator) in contact with pump diaphragm 612. FIG. 13 also shows a valve 1310 at each end of manifold 418 between positive-displacement pump 610 and inlets 520 for print fluid (i.e., I/O ports 211-212). For the in-flow cycle, the actuator 614 retracts the pump diaphragm 612 (in the upward direction in FIG. 13). Retraction of pump diaphragm 612 increases the volume of manifold 418, which pulls or draws print fluid into manifold 418 through I/O ports 211-212 from the supply reservoir. A negative pressure remains in jetting channels 302 that is below the meniscus-breaking pressure at the nozzles 314. Valves 1310 disposed at ends of manifold 418 act to restrict a backward flow of print fluid that is drawn into manifold 418 through I/O ports 211-212. In FIG. 12, another pump cycle provides a supply of print fluid from manifold 418 to the jetting channels 302. For the supply cycle, actuator 614 extends the pump diaphragm 612 to discharge print fluid from manifold 418 to the jetting channels 302 (step 1208). FIG. 14 is a schematic diagram of printhead 104 with a positive-displacement pump 610 in another illustrative embodiment. For the supply pump cycle, the actuator 614 extends or expands the pump diaphragm 612 (in the downward direction in FIG. 14). Extension of pump diaphragm 612 decreases the volume of manifold 418, which forces print fluid out of manifold 418 and into the jetting channels 302 (i.e., through the restrictors). FIG. 14 also shows valves 1310 disposed between manifold 418 and each of the jetting channels 302. Valves 1310 act to restrict a backward flow of print fluid supplied from manifold 418 to the jetting channels 302.

Method 1200 may be repeated as desired to draw print fluid into printhead 104, and to provide print fluid to the jetting channels 302 so that the print fluid may be jetted from jetting channels 302.

The above embodiments described non-flow-through types of printheads. In another embodiment, printhead 104 may comprise a flow-through type. In a flow-through type, the printhead includes multiple manifolds that are fluidly coupled to the jetting channels 302. One of the manifolds (referred to as a supply manifold) supplies print fluid to the jetting channels 302. Another manifold (referred to as a return manifold) receives print fluid that is not jetted from the jetting channels 302 (i.e., non-jetted print fluid). Thus, print fluid is able to flow through or circulate through the jetting channels 302 from the supply manifold to the return manifold. Circulation of print fluid may be advantageous in that print fluid does not rest in the jetting channels 302 when idle to avoid potential drying or settling.

Figure 15:
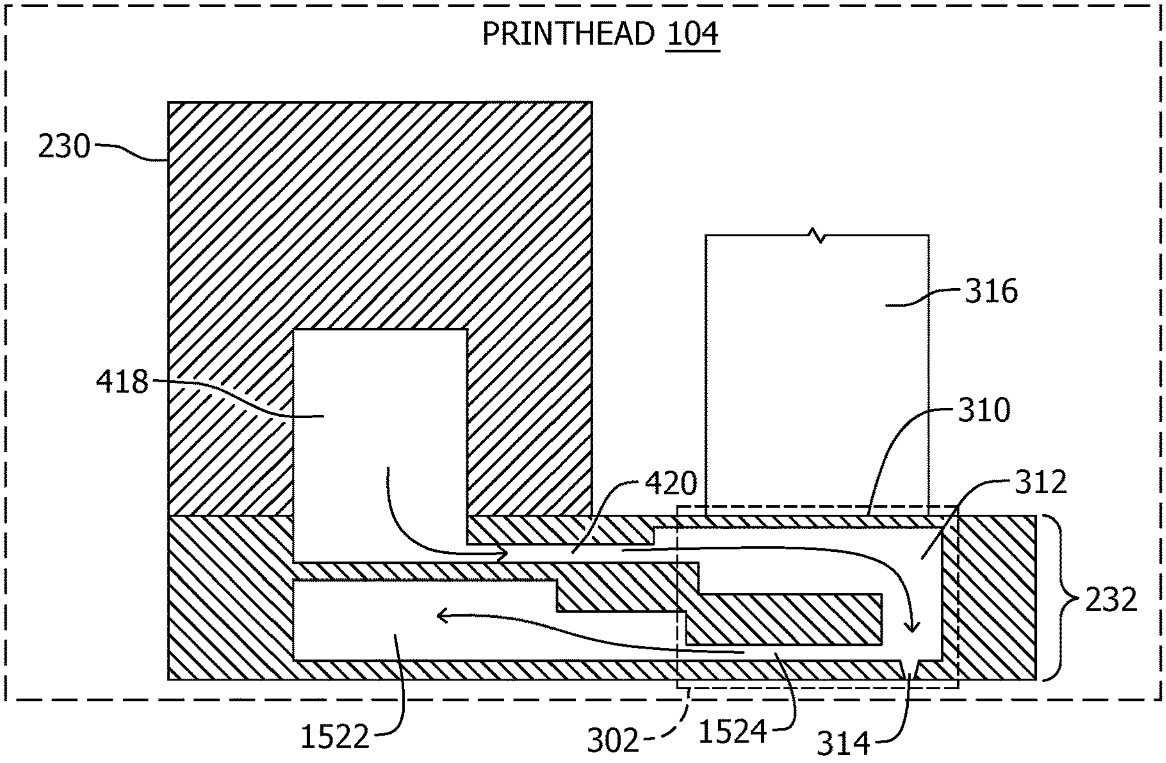
FIGS. 15-16 are schematic diagrams of a flow-through jetting channel within a printhead in an illustrative embodiment.
Figure 16:
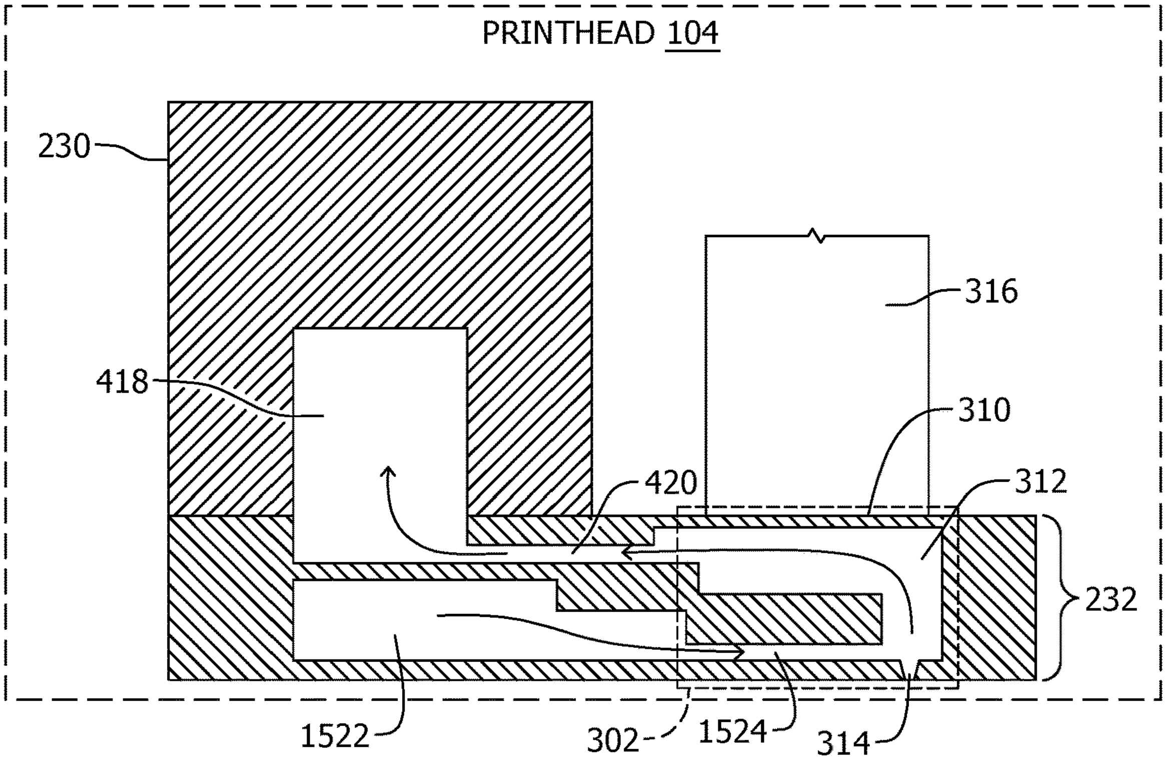

FIGS. 15-16 are schematic diagrams of a flow-through jetting channel 302 within a printhead 104 in an illustrative embodiment. The view in FIGS. 15-16 is of a cross-section of a jetting channel 302 across a width of a portion of printhead 104. Pressure chamber 312 is fluidly coupled to a manifold 418 (e.g., supply manifold) through a first restrictor 420, and is fluidly coupled to a manifold 1522 (e.g., return manifold) through a second restrictor 1524. Restrictor 420 fluidly couples pressure chamber 312 with manifold 418, and controls the flow of the print fluid into pressure chamber 312. Restrictor 1524 fluidly couples pressure chamber 312 to manifold 1522, and controls the flow of the print fluid out of pressure chamber 312. When printhead 104 is a "flow-through" printhead or re-circulating printhead, the print fluid may be re-circulated through printhead 104 past each nozzle 314.

The arrows in FIG. 15 illustrate a flow path of a print fluid through jetting channel 302 in one direction. The print fluid flows from manifold 418 and into pressure chamber 312 through restrictor 420. One wall of pressure chamber 312 is formed with diaphragm 310 that physically interfaces with actuator 316, and vibrates in response to actuation by actuator 316. The print fluid flows through pressure chamber 312 and out of nozzle 314 in the form of a droplet in response to actuation by actuator 316. The print fluid, which is not jetted from nozzle 314, flows from pressure chamber 312 into manifold 1522 through restrictor 1524. The print fluid that is not jetted from a nozzle 314 is referred to herein as "non jetted print fluid".

The arrows in FIG. 16 illustrate a flow path of a print fluid within jetting channel 302 in a reverse direction. The print fluid flows from manifold 1522 and into pressure chamber 312 through restrictor 1524. The print fluid flows through pressure chamber 312 and out of nozzle 314 in the form of a droplet in response to actuation by actuator 316. The print fluid, which is not jetted from nozzle 314, flows from pressure chamber 312 into manifold 418 through restrictor 420. The length of restrictors 420 and 1524 may be the same to allow for a reversal of flow in this manner.

A jetting channel 302 as shown in FIGS. 15-16 is an example to illustrate a basic structure of a flow-through jetting channel, such as the diaphragm, pressure chamber, and nozzle. Other types of flow-through jetting channels are also considered herein.

Figure 17:
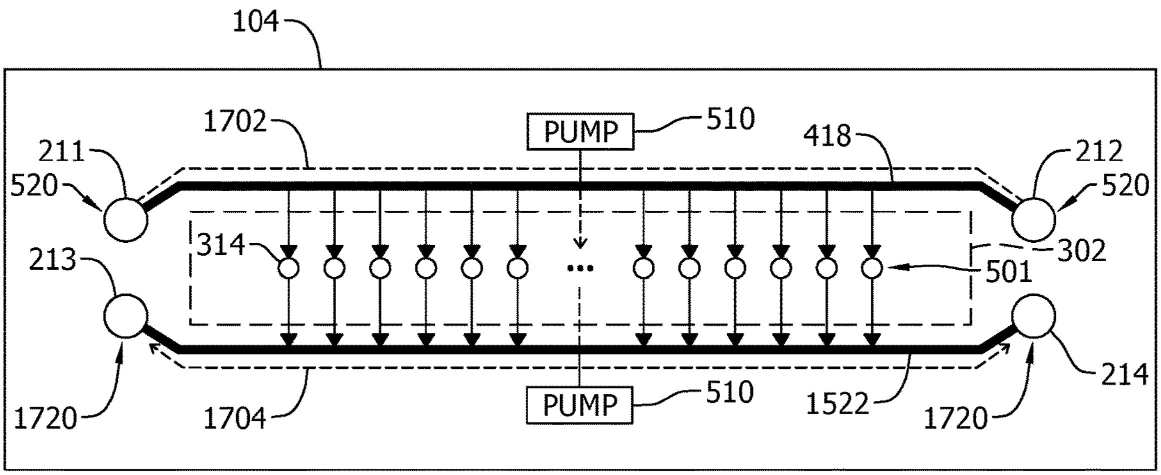
FIG. 17 is a schematic diagram of a printhead in an illustrative embodiment.

FIG. 17 is a schematic diagram of a printhead 104 in an illustrative embodiment. The jetting channels 302 of printhead 104 are schematically illustrated in FIG. 17 as nozzles 314 in a single nozzle row 501. Printhead 104 (i.e., head member 202) includes a plurality of manifolds 418 and 1522. I/O ports 211-212 define inlets 520 of print fluid into printhead 104, and I/O ports 213-214 define outlets 1720 of print fluid out of printhead 104. One of the manifolds 418 comprises or defines a fluid path 1702 between I/O ports 211-212 and the jetting channels 302. Thus, manifold 418 is configured to convey a print fluid from an inlet 520 of printhead 104 (i.e., I/O port 211 and/or I/O port 212) to the jetting channels 302. The major portions or sections of supply manifold 418 are disposed longitudinally within printhead 104 to fluidly couple with the jetting channels 302. The other manifold 1522 comprises or defines a fluid path 1704 between I/O ports 213-214 and the jetting channels 302. Thus, manifold 1522 is configured to convey non-jetted print fluid from the jetting channels 302 to an outlet 1720 of printhead 104 (i.e., I/O port 213 and/or I/O port 214). The major portions or sections of manifold 1522 are disposed longitudinally within printhead 104 to fluidly couple with the jetting channels 302. Manifolds 418 and 1522 may be fluidly isolated so that print fluid is prevented from flowing directly between manifolds 418 and 1522 (although it is noted that manifolds 418 and 1522 are fluidly coupled indirectly through the jetting channels 302). Thus, the fluid path 1702 between I/O ports 211-212 and the jetting channels 302 is isolated or distinct from the fluid path 1704 between I/O ports 213-214 and the jetting channels 302. In other words, fluid path 1702 is a flow of print fluid into printhead 104, through manifold 418, and to an entry point of the jetting channels 302 (e.g., restrictors 420), while fluid path 1704 is a flow of print fluid (non-jetted) from an exit point (e.g., restrictors 1524) of the jetting channels 302, through manifold 1522, and out of the printhead 104.

Manifold 418 may be referred to as a supply manifold, and manifold 1522 may be referred to as a return manifold in this embodiment. However, because the flow of print fluid through printhead 104 may be reversed, manifold 418 may act as a return manifold, and manifold 1522 may act as a supply manifold depending on the direction of flow of print fluid through printhead 104. Although two manifolds 418 and 1522 are illustrated in FIG. 17, a printhead 104 may include more or less manifolds as desired.

In this embodiment, an internal pump 510 is disposed or implemented at manifold 418 and at manifold 1522. In FIG. 17, manifold 418 defines a fluid path 1702 between I/O ports 211-212 and the jetting channels 302. Thus, an internal pump 510 is disposed in the fluid path 1702 between I/O ports 211-212 and the jetting channels 302 to move a print fluid from entry points (i.e., I/O ports 211-212) of printhead 104 to jetting channels 302. Likewise, manifold 1522 defines a fluid path 1704 between I/O ports 213-214 and the jetting channels 302. Thus, an internal pump 510 is disposed in the fluid path 1704 between I/O ports 213-214 and the jetting channels 302 to move a print fluid from jetting channels 302 to exit points (i.e., I/O ports 213-214) of printhead 104. Although not shown in FIG. 17, one or more valves may be implemented in manifold 418 between inlets 520 and internal pump 510, and one or more valves may be implemented in manifold 1522 between internal pump 510 and outlets 1720. Also, a valve may be implemented between manifold 418 and each of the jetting channels 302 (i.e., in the fluid path between manifold 418 and each of the jetting channels 302), and a valve may be implemented between each of the jetting channels 302 and manifold 1522 (i.e., in the fluid path between each of the jetting channels 302 and manifold 1522).

Figure 18:
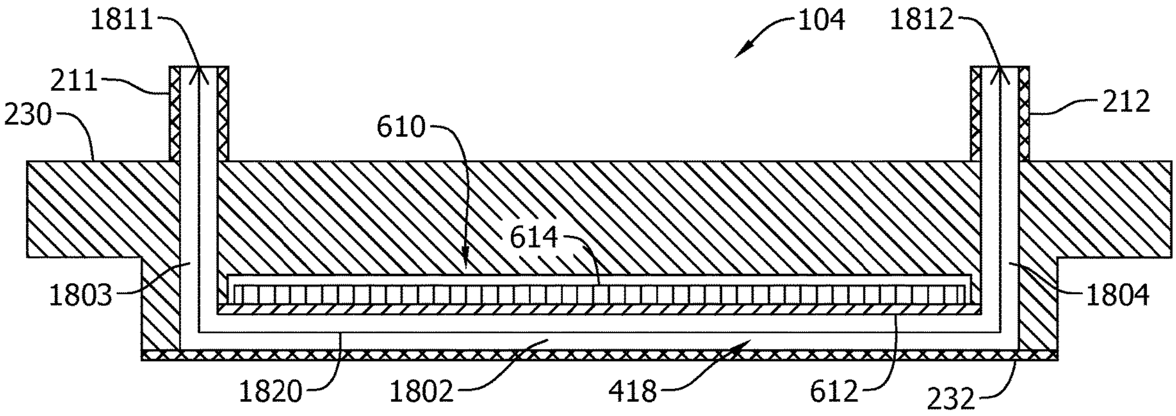
FIGS. 18-19 are cross-sectional views of a printhead in an illustrative embodiment.

FIG. 18 is another cross-sectional view of printhead 104 in an illustrative embodiment. The cross-section shown in FIG. 18 is along a longitudinal cut-plane through printhead 104 to show manifold 418. In this embodiment, manifold 418 includes a longitudinal section 1802 that is generally disposed longitudinally within printhead 104 along a row of jetting channels 302, and fluidly coupled to the jetting channels 302. Manifold 418 also includes transverse sections 1803-1804 that are generally disposed transversely within printhead 104 between longitudinal section 1802 and open ends 1811-1812, respectively. The length 1820 of manifold 418 may therefore be defined as the length of a fluid path between open end 1811 and open end 1812.

In this embodiment, a positive-displacement pump 610 is disposed at manifold 418. Positive-displacement pump 610 is disposed along longitudinal section 1802 of manifold 418. Thus, pump diaphragm 612 of positive-displacement pump 610 defines a wall 601-604 of manifold 418 along longitudinal section 1802, which is the top wall 601 in this embodiment (see FIG. 6). Pump diaphragm 612 may extend along the entire length of longitudinal section 1802 as shown in FIG. 18, or a portion of the length of longitudinal section 1802. Although pump diaphragm 612 is illustrated as defining a top wall 601 of manifold 418 in FIG. 18, pump diaphragm 612 may define a side wall 602-603 or bottom wall 604 in other embodiments.

Figure 19:
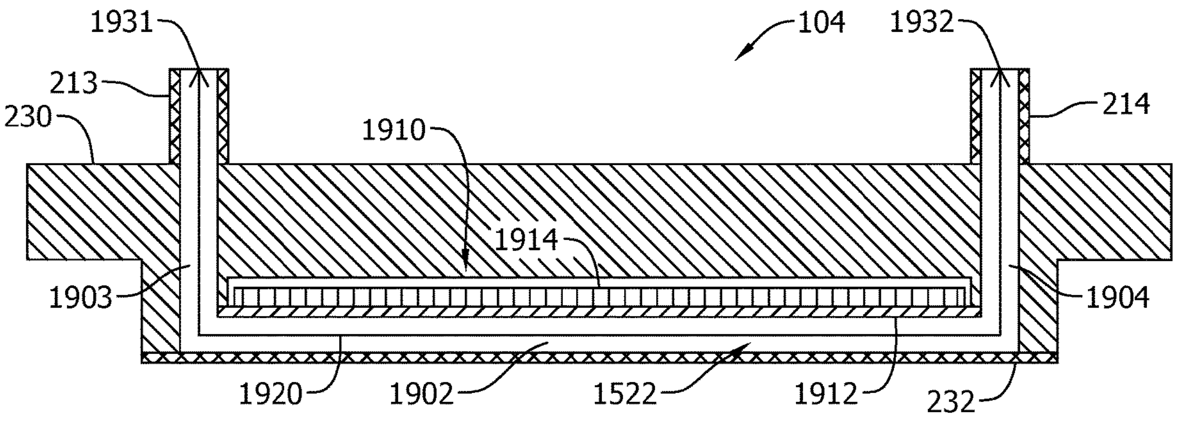

FIG. 19 is another cross-sectional view of printhead 104 in an illustrative embodiment. The cross-section shown in FIG. 19 is along a longitudinal cut-plane through printhead 104 to show manifold 1522. In this embodiment, manifold 1522 includes a longitudinal section 1902 that is generally disposed longitudinally within printhead 104 along a row of jetting channels 302. Manifold 1522 also includes transverse sections 1903-1904 that are generally disposed transversely within printhead 104 between longitudinal section 1902 and open ends 1931-1932, respectively. The length 1920 of manifold 1522 may therefore be defined as the length of a fluid path between open end 1931 and open end 1932.

In this embodiment, a positive-displacement pump 1910 is disposed at manifold 1522. As above, positive-displacement pump 1910 includes a pump diaphragm 1912 that defines a wall 601-604 of manifold 1522, and an actuator 1914 that contacts pump diaphragm 1912, and is configured to impart movement to, or displace, the pump diaphragm 1912. Pump diaphragm 1912 defines a wall 601-604 of manifold 1522 along longitudinal section 1902, which is the top wall 601 in this embodiment (see FIG. 6). Pump diaphragm 1912 may extend along the entire length of longitudinal section 1902 as shown in FIG. 19, or a portion of the length of longitudinal section 1902. Although pump diaphragm 1912 is illustrated as defining a top wall 601 of manifold 1522 in FIG. 19, pump diaphragm 1912 may define a side wall 602-603 or bottom wall 604 in other embodiments.

Figure 20:
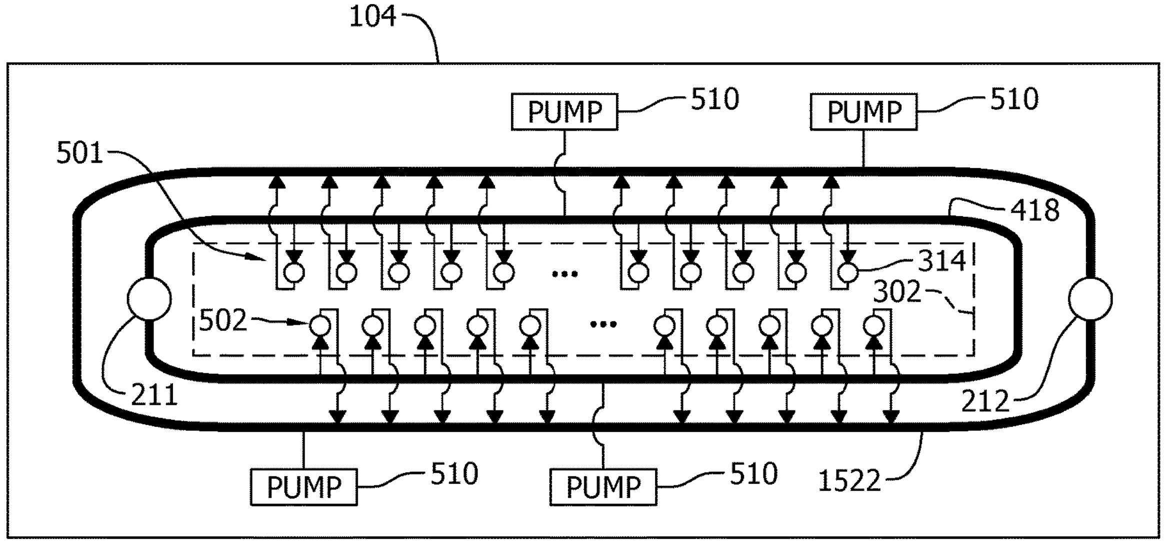
FIG. 20 is another schematic diagram of a printhead in an illustrative embodiment.

FIG. 20 is another schematic diagram of a printhead 104 in an illustrative embodiment. In this embodiment, a single I/O port 211-212 is fluidly coupled to each manifold 418 and 1522. The jetting channels 302 of printhead 104 are schematically illustrated in FIG. 20 as nozzles 314 in two nozzle rows 501-502. Although the nozzles 314 are shown as staggered in FIG. 20, the nozzles 314 in the nozzle rows 501-502 may be aligned in other embodiments.

In this embodiment, a plurality of internal pumps 510 are disposed or implemented at manifold 418 and manifold 1522. In FIG. 20, manifold 418 defines a fluid path between I/O port 211 and the jetting channels 302, and multiple internal pumps 510 are disposed in the fluid path between I/O port 211 and the jetting channels 302 to move a print fluid from an entry point (i.e., I/O port 211) of printhead 104 to jetting channels 302. The internal pumps 510 may be controlled individually to address any pressure differential along manifold 418. Likewise, manifold 1522 defines a fluid path between I/O port 212 and the jetting channels 302. Multiple internal pumps 510 are disposed in the fluid path between I/O port 212 and the jetting channels 302 to move a print fluid from jetting channels 302 to an exit point (i.e., I/O port 212) of printhead 104.

Figure 21:
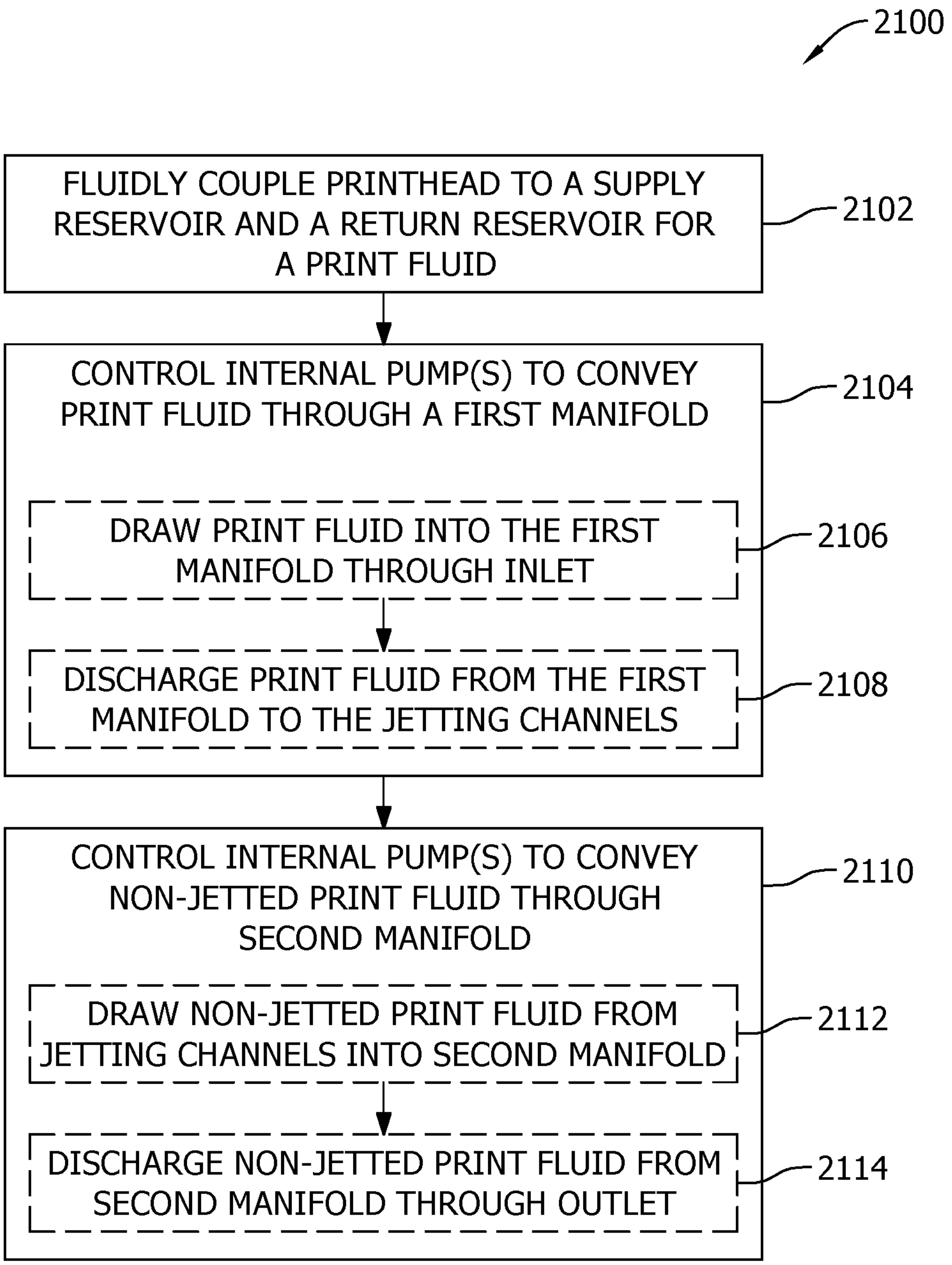
FIG. 21 is a flow chart illustrating a method of operating a printhead in an illustrative embodiment.

FIG. 21 is a flow chart illustrating a method 2100 of operating a printhead 104 in an illustrative embodiment. The steps of method 2100 will be described with reference to a flow-through type of printhead 104 as discussed in FIGS. 15-20, but those skilled in the art will appreciate that method 2100 may be performed in other flow-through types of printheads.

The printhead 104 is fluidly coupled to a supply reservoir and a return reservoir for a print fluid (step 2102). Again, a supply reservoir (e.g., one of reservoirs 124 in FIG. 1) comprises a supply tank, a supply cartridge, or the like that contains a print fluid to be jetted by printhead 104. For example, I/O ports 211-212 of printhead 104 as in FIG. 17 may be coupled to the supply reservoir with a hose, tube, etc., and I/O ports 211-212 act as an inlet of print fluid to printhead 104. A return reservoir (e.g., another one of reservoirs 124 in FIG. 1) comprises a tank or the like that receives non-jetted print fluid from printhead 104. For example, I/O ports 213-214 of printhead 104 as in FIG. 17 may be coupled to the return reservoir with a hose, tube, etc., and I/O ports 213-214 act as an outlet for print fluid out of printhead 104. If printhead 104 is configured to jet different types of print fluids, then printhead 104 may be fluidly coupled to other additional reservoirs.

An internal pump 510 (or multiple internal pumps 510) within printhead 104 is controlled (step 2104) to convey the print fluid through manifold 418 (e.g., first manifold). More particularly, the internal pump(s) 510 is controlled to draw print fluid into manifold 418 through inlet(s) 520 from the supply reservoir (step 2106). The internal pump(s) 510 is then controlled to discharge print fluid from manifold 418 to the jetting channels 302 (step 2108) that are fluidly coupled to the manifold 418. A valve, if implemented between an inlet 520 and internal pump 510, may act to restrict a backward flow of print fluid that is drawn into manifold 418 through inlet 520. A valve, if implemented between manifold 418 and a jetting channel 302, may act to restrict a backward flow of print fluid discharged from the manifold 418 to the jetting channel 302. Internal pump(s) 510 may be controlled or driven by controller 122 as shown in FIG. 1, printhead controller 206 as shown in FIG. 2, or another type of controller.

Additionally, an internal pump 510 (or multiple internal pumps 510) within printhead 104 is controlled (step 2110) to convey non-jetted print fluid through manifold 1522 (e.g., second manifold). More particularly, the internal pump(s) 510 is controlled to draw non-jetted print fluid from the jetting channels 302 into manifold 1522 (step 2112). The internal pump(s) 510 is then controlled to discharge the non jetted print fluid from manifold 1522 through outlet(s) 1720 to the return reservoir (step 2114). A valve, if implemented between a jetting channel 302 and manifold 1522, may act to restrict a backward flow of non-jetted print fluid drawn into manifold 1522 from the jetting channel. A valve, if implemented between internal pump 510 and an outlet 1720, may act to restrict a backward flow of non jetted print fluid discharged from manifold 1522 through the outlet 1720.

Internal pump 510 at manifold 418 and internal pump 510 at manifold 1522 work in unison to generate the proper pressure distribution in printhead 104 in order to draw print fluid into inlet 520 of printhead 104 from a supply reservoir, move the print fluid through manifold 418 to the jetting channels 302, move non jetted print fluid from the jetting channels 302 through manifold 1522, and out through outlet 1720 to a return reservoir. One technical benefit is the internal pumps 510 eliminate the need for a complex and expensive external delivery system to move the print fluid through a printhead.

Figure 22:
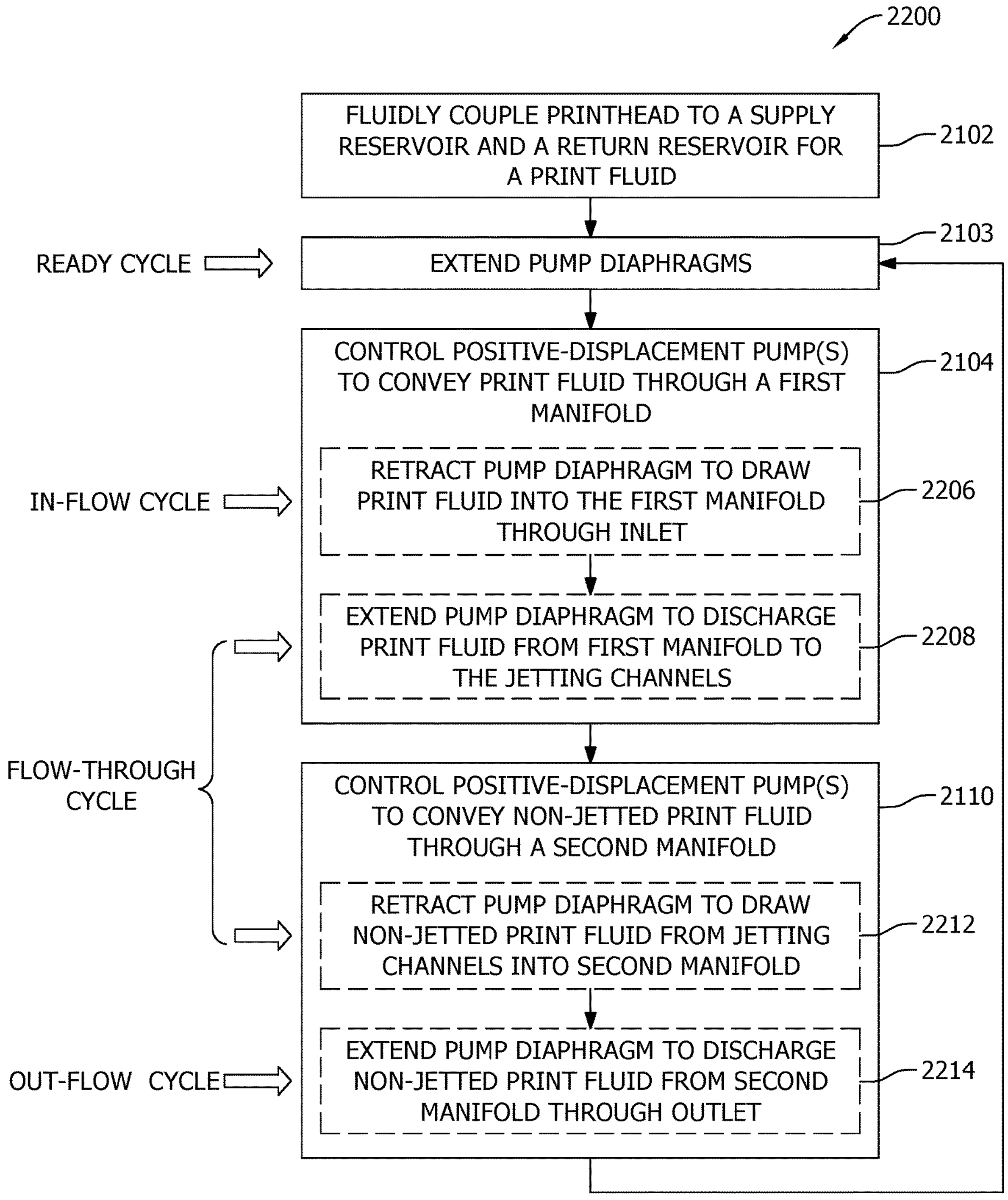
FIG. 22 is a flow chart illustrating another method of operating a printhead in an illustrative embodiment.
Figure 23:
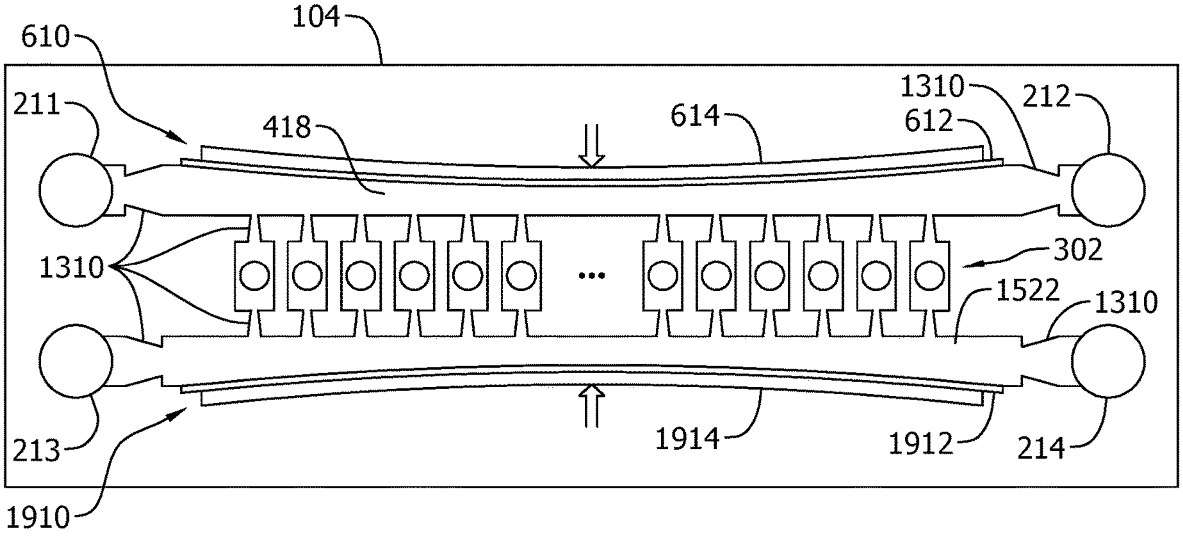
FIGS. 23-26 are schematic diagrams of a printhead with positive-displacement pumps in an illustrative embodiment.

FIG. 22 is a flow chart illustrating another method 2200 of operating a printhead 104 in an illustrative embodiment. Operation of printhead 104 for method 2200 may be for jetting operations or re-circulation operations. In this embodiment, the internal pump(s) 510 of printhead 104 comprise positive-displacement pumps 610 as shown in FIGS. 18-19. As before, the printhead 104 is fluidly coupled to a supply reservoir and a return reservoir for a print fluid (step 2102). Control of the positive-displacement pumps 610/1910 may again be described as pump cycles. One pump cycle may be referred to as the ready cycle. For the ready cycle, actuator 614 of positive-displacement pump 610 is controlled to extend pump diaphragm 612, and actuator 1914 of positive-displacement pump 1910 is controlled to extend pump diaphragm 1912 (step 2103). FIG. 23 is a schematic diagram of printhead 104 with positive-displacement pumps 610/1910 in an illustrative embodiment. FIG. 23 shows manifold 418 and manifold 1522 fluidly coupled to a row of jetting channels 302. Positive-displacement pump 610 at manifold 418 includes a pump diaphragm 612 that defines a wall 601-604 of manifold 418, and an actuator 614 (e.g., PZT actuator) in contact with pump diaphragm 612. Likewise, positive-displacement pump 1910 at manifold 1522 includes a pump diaphragm 1912 that defines a wall 601-604 of manifold 1522, and an actuator 1914 (e.g., PZT actuator) in contact with pump diaphragm 1912. For the ready cycle, actuator 614 extends pump diaphragm 612 (in the downward direction in FIG. 23), and actuator 1914 extends pump diaphragm 1912 (in the upward direction in FIG. 23). Actuators 614/1914 may move pump diaphragms 612/1912 slowly to keep the pressure at the nozzles 314 below the meniscus-breaking pressure.

Figure 24:
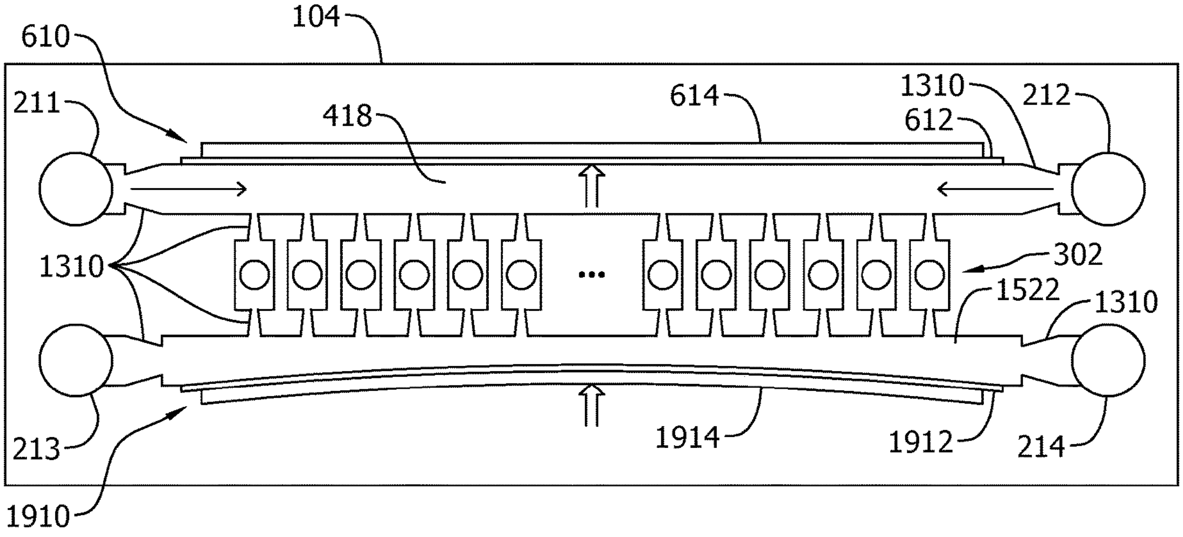

In FIG. 22, another pump cycle provides an in-flow of print fluid into manifold 418 (e.g., first manifold) from the supply reservoir. For the in-flow cycle, actuator 614 of positive-displacement pump 610 is controlled to retract the pump diaphragm 612 (step 2206), which draws print fluid into manifold 418 through inlet 520 from the supply reservoir (as in step 2106 of FIG. 21). FIG. 24 is a schematic diagram of printhead 104 with positive-displacement pumps 610/1910 in an illustrative embodiment. FIG. 24 also shows a valve 1310 at each end of manifold 418 between positive-displacement pump 610 and inlets 520 for print fluid (i.e., I/O ports 211-212). For the in-flow cycle, actuator 614 retracts pump diaphragm 612 (in the upward direction in FIG. 24). Retraction of pump diaphragm 612 increases the volume of manifold 418, which pulls or draws print fluid into manifold 418 through I/O ports 211-212 from the supply reservoir. A negative pressure remains at the nozzles 314 that is below the meniscus-breaking pressure. Valves 1310 disposed at ends of manifold 418 act to restrict a backward flow of print fluid that is drawn into manifold 418 through I/O ports 211-212.

Figure 25:
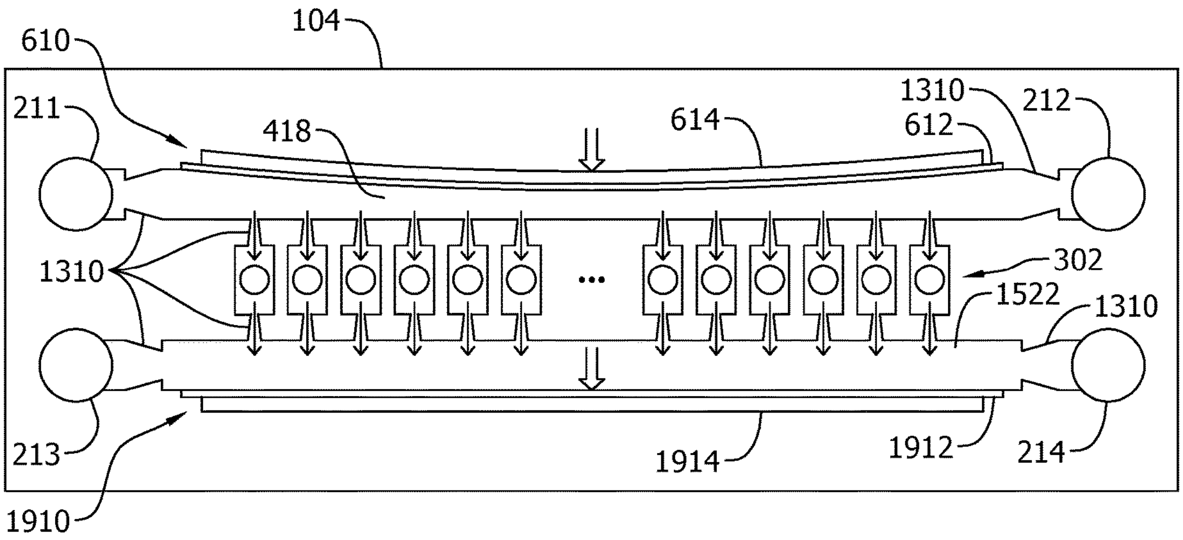

In FIG. 22, another pump cycle provides a flow of print fluid through jetting channels 302. For the flow-through cycle, actuator 614 is controlled to extend pump diaphragm 612 to discharge the print fluid from manifold 418 to the jetting channels 302 (step 2208), and actuator 1914 is controlled to retract pump diaphragm 1912 to draw non-jetted print fluid from the jetting channels 302 into manifold 1522 (e.g., second manifold) (step 2212). FIG. 25 is a schematic diagram of printhead 104 with positive-displacement pumps 610/1910 in another illustrative embodiment. For the flow-through cycle, actuator 614 extends pump diaphragm 612 (in the downward direction in FIG. 25). Extension of pump diaphragm 612 decreases the volume of manifold 418, which forces print fluid out of manifold 418 and into the jetting channels 302 (i.e., through the restrictors). FIG. 25 also shows valves 1310 disposed between manifold 418 and each of the jetting channels 302, which act to restrict a backward flow of print fluid supplied from manifold 418 to the jetting channels 302. Concurrently (e.g., at the same time or offset with a small time offset), actuator 1914 retracts pump diaphragm 1912 (in the downward direction in FIG. 25). Retraction of pump diaphragm 1912 decreases the volume of manifold 1522, which draws non-jetted print fluid out of the jetting channels 302 and into manifold 1522 (i.e., through the restrictors). FIG. 25 also shows valves 1310 disposed between each of the jetting channels 302 and manifold 1522, which acts to restrict a backward flow of non-jetted print fluid drawn into manifold 1522 from the jetting channels 302. Actuator 1914 may be instructed to retract pump diaphragm 1912 at a faster rate than actuator 614 extends pump diaphragm 612 (e.g., pump diaphragm 1912 completes retraction before pump diaphragm 612 completes extension) to maintain a negative pressure at the nozzles 314 that is below the meniscus-breaking pressure.

Figure 26:
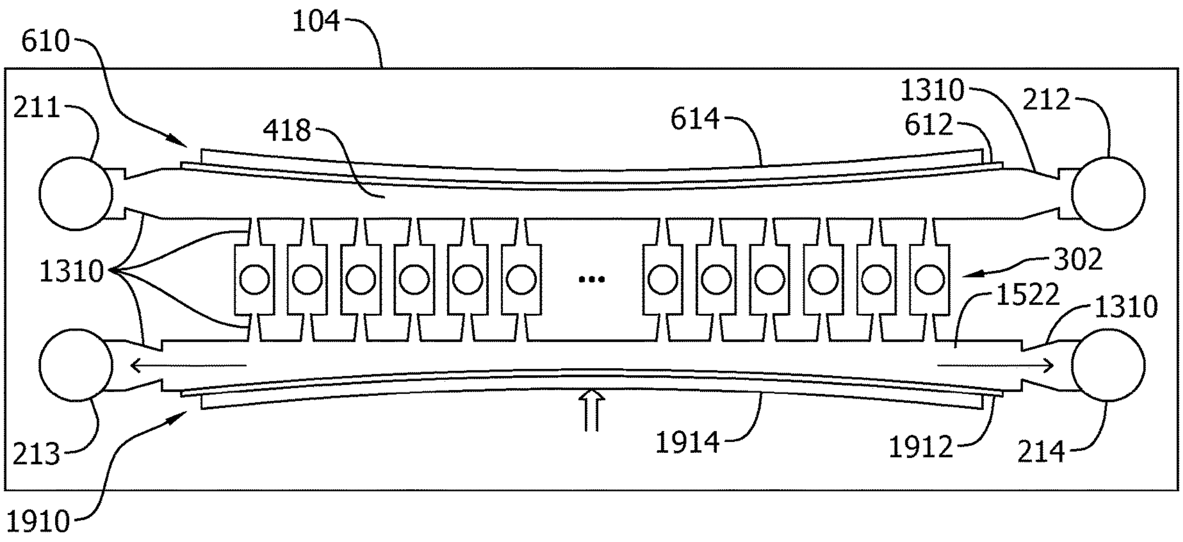

In FIG. 22, another pump cycle provides an out-flow of print fluid from manifold 1522 (e.g., second manifold) to the return reservoir. For the out-flow cycle, actuator 1914 of positive-displacement pump 1910 is controlled to extend pump diaphragm 1912 to discharge the non-jetted print fluid from manifold 1522 through outlet 1720 to the return reservoir (step 2214). FIG. 26 is a schematic diagram of printhead 104 with positive-displacement pumps 610/1910 in another illustrative embodiment. FIG. 26 also shows a valve 1310 at each end of manifold 1522 between positive-displacement pump 1910 and outlets 1720 for print fluid (i.e., I/O ports 213-214). For the out-flow cycle, actuator 1914 extends pump diaphragm 1912 (in the upward direction in FIG. 26). Extension of pump diaphragm 612 decreases the volume of manifold 1522, which forces the non-jetted print fluid out of manifold 1522 through outlet 1720 and into the return reservoir. Valves 1310 disposed at ends of manifold 1522 act to restrict a backward flow of print fluid discharged from manifold 1522 through I/O ports 213-214. Actuator 614 may also retract pump diaphragm 612 concurrently (e.g., at the same time or offset with a small time offset) to generate a negative pressure at the nozzles 314.

When operating printhead 104 in this manner, positive-displacement pump 610 generates positive pressure on the high-pressure side of the jetting channels 302 while positive-displacement pump 1910 generates a slightly higher negative pressure so that the resultant pressure at the jetting channels 302 is slightly negative to keep the meniscus at the nozzles 314 retracted and prevent weeping of the print fluid.

Method 2200 may be repeated as desired to circulate print fluid through the jetting channels 302.

Figure 27:
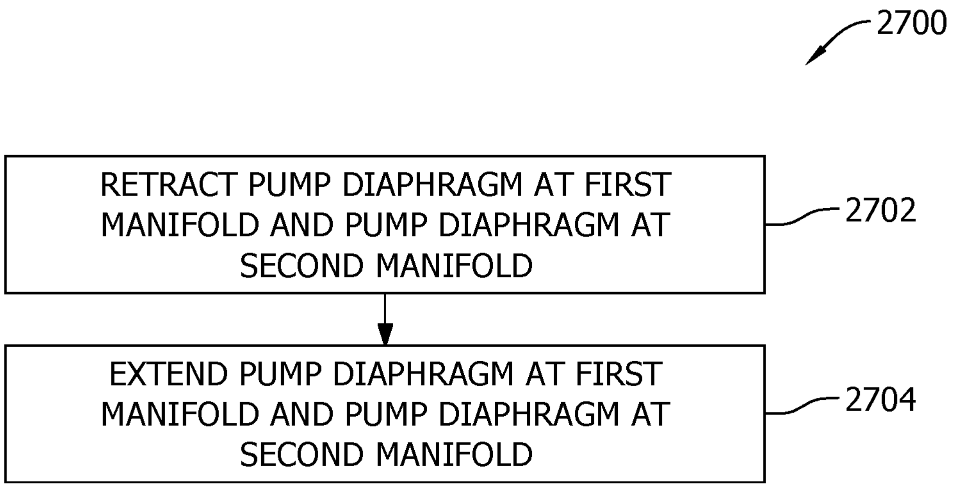
FIG. 27 is a flow chart illustrating another method of operating a printhead in an illustrative embodiment.
Figure 28:
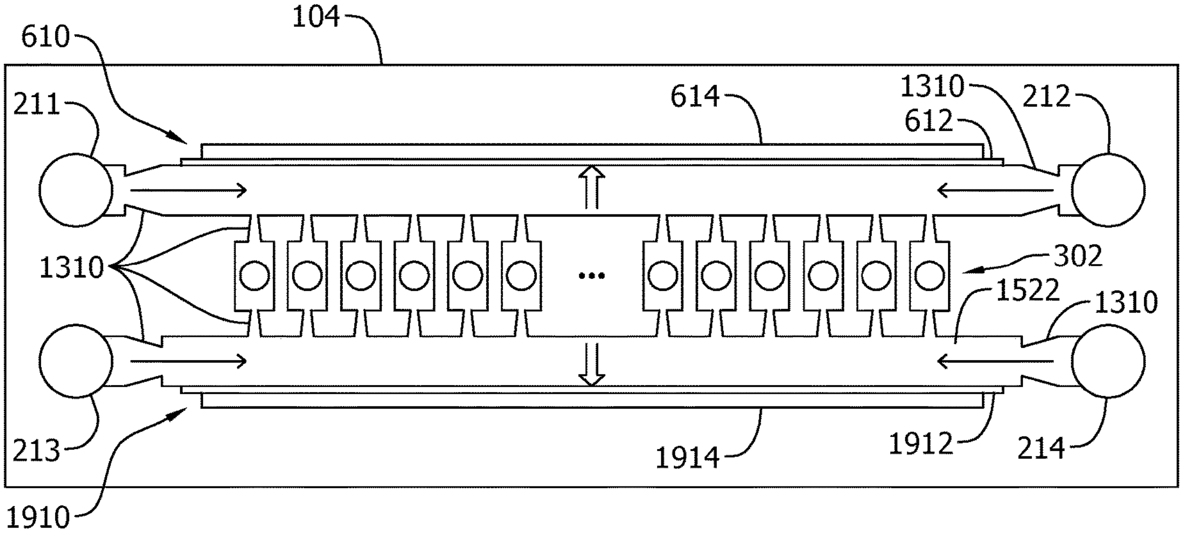
FIGS. 28-29 are schematic diagrams of a printhead with positive-displacement pumps in an illustrative embodiment.

FIG. 27 is a flow chart illustrating another method 2700 of operating a printhead 104 in an illustrative embodiment. Operation of printhead 104 for method 2700 is for a purging operation. Actuator 614 of positive-displacement pump 610 is controlled to retract pump diaphragm 612, and actuator 1914 of positive-displacement pump 1910 is controlled to retract pump diaphragm 1912 (step 2702). FIG. 28 is a schematic diagram of printhead 104 with positive-displacement pumps 610/1910 in an illustrative embodiment. Actuator 614 retracts pump diaphragm 612 (in the upward direction in FIG. 28). Retraction of pump diaphragm 612 increases the volume of manifold 418, which pulls print fluid into manifold 418 through I/O ports 211-212. While pump diaphragm 612 is partially retracted, actuator 1914 retracts pump diaphragm 1912 (in the downward direction in FIG. 28) at a slightly faster speed than actuator 614 retracts pump diaphragm 612 so as to maintain a negative pressure at the nozzles that is below the meniscus-breaking pressure (e.g., pump diaphragm 1912 completes retraction before pump diaphragm 612 completes extension). This prevents air ingestion through the nozzles.

Figure 29:
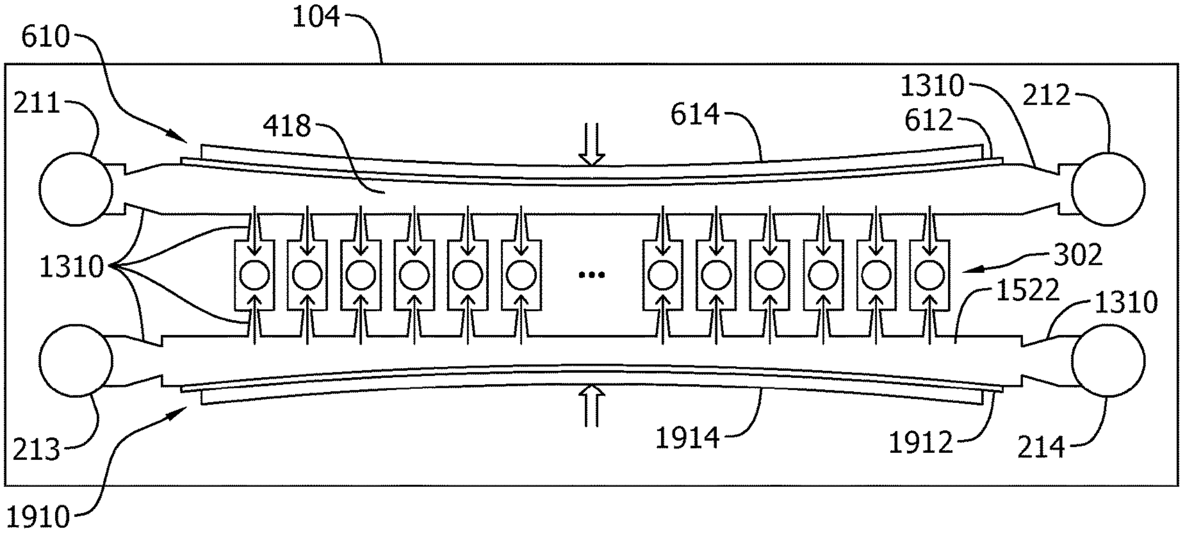

In FIG. 27, actuator 614 of positive-displacement pump 610 is controlled to extend pump diaphragm 612, and actuator 1914 of positive-displacement pump 1910 is controlled to extend pump diaphragm 1912 (step 2704). FIG. 29 is a schematic diagram of printhead 104 with positive-displacement pumps 610/1910 in an illustrative embodiment. Pump diaphragms 612 and 1912 are extended concurrently to force print fluid (and any air in the print fluid) out of the nozzles 314 of the jetting channels 302. Thus, the jetting channels 302 are purged. A technical benefit of this purging operation is that the jetting channels 302 are purged with the print fluid forced to exit the printhead 104 through the nozzles 314 without depending on the actuators 316 of the jetting channels 302 to actuate (i.e., fire). Purging may then proceed even without a functioning actuator 316.

Figure 30:
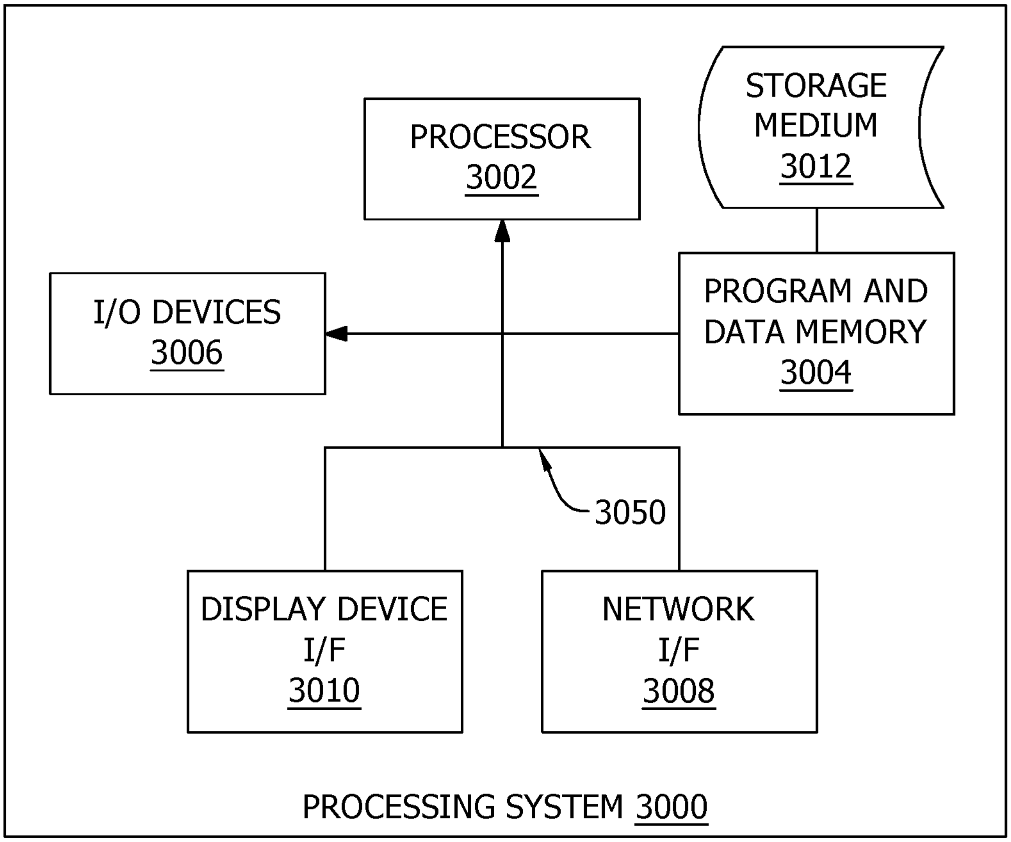
FIG. 30 illustrates a processing system operable to execute a computer readable medium embodying programmed instructions to perform desired functions in an illustrative embodiment.

Embodiments disclosed herein can take the form of software, hardware, firmware, or various combinations thereof. FIG. 30 illustrates a processing system 3000 operable to execute a computer readable medium embodying programmed instructions to perform desired functions in an illustrative embodiment. Processing system 3000 is operable to perform the above operations by executing programmed instructions tangibly embodied on computer readable storage medium 3012. In this regard, embodiments can take the form of a computer program accessible via computer-readable medium 3012 providing program code for use by a computer or any other instruction execution system. For the purposes of this description, computer readable storage medium 3012 can be anything that can contain or store the program for use by the computer.

Computer readable storage medium 3012 can be an electronic, magnetic, optical, electromagnetic, infrared, or semiconductor device. Examples of computer readable storage medium 3012 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 3000, being suitable for storing and/or executing the program code, includes at least one processor 3002 coupled to program and data memory 3004 through a system bus 3050. Program and data memory 3004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 3006 (including but not limited to keyboards, displays, pointing devices, etc.) can be coupled either directly or through intervening I/O controllers. Network adapter interfaces 3008 may also be integrated with the system to enable processing system 3000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 3010 may be integrated with the system to interface to one or more display devices, such as printing systems and screens for presentation of data generated by processor 3002.

Although specific embodiments were described herein, the scope of the invention is not limited to those specific embodiments. The scope of the invention is defined by the following claims and any equivalents thereof.

What is claimed is:

1. A printhead comprising:

a plurality of jetting channels;

a first manifold internal to the printhead that is configured to convey a print fluid from an inlet of the printhead to the jetting channels; and a first internal pump disposed at the first manifold, and configured to draw the print fluid into the first manifold through the inlet, and to discharge the print fluid from the first manifold to the jetting channels;

wherein the first internal pump includes:

a pump diaphragm that defines a wall of the first manifold; and an actuator configured to displace the pump diaphragm.

2. The printhead of claim 1 comprising:

a plurality of first internal pumps disposed at the first manifold that are individually controlled.

3. The printhead of claim 1 wherein:

the actuator is configured to retract the pump diaphragm to draw the print fluid into the first manifold through the inlet, and to extend the pump diaphragm to discharge the print fluid from the first manifold to the jetting channels.

4. The printhead of claim 3 further comprising:

a valve disposed between the inlet and the first internal pump to restrict a backflow of the print fluid drawn into the first manifold through the inlet; and valves disposed between the first manifold and each of the jetting channels to restrict a backflow of the print fluid discharged from the first manifold to the jetting channels.

5. The printhead of claim 1 wherein the jetting channels comprise flow-through jetting channels, and the printhead further comprises:

a second manifold internal to the printhead that is configured to convey non-jetted print fluid from the flow-through jetting channels to an outlet of the printhead; and a second internal pump disposed at the second manifold, and configured to draw the non-jetted print fluid from the flow-through jetting channels into the second manifold, and to discharge the non jetted print fluid from the second manifold through the outlet.

6. A jetting apparatus comprising:

the printhead of claim 1.

7. A method of operating a printhead, the method comprising:

controlling a first internal pump within the printhead, wherein the printhead comprises a plurality of jetting channels, a first manifold internal to the printhead configured to convey a print fluid from an inlet of the printhead to the jetting channels, and the first internal pump disposed at the first manifold, and wherein the first internal pump includes a first pump diaphragm that defines a wall of the first manifold, and a first actuator configured to displace the first pump diaphragm;

wherein the controlling the first internal pump comprises:

controlling the first actuator to retract the first pump diaphragm to draw the print fluid into the first manifold through the inlet; and controlling the first actuator to extend the first pump diaphragm to discharge the print fluid from the first manifold to the jetting channels.

8. The method of claim 7 wherein the jetting channels comprise flow-through jetting channels, the method further comprising:

controlling a second internal pump within the printhead, wherein the printhead further comprises a second manifold internal to the printhead that is configured to convey non-jetted print fluid from the flow-through jetting channels to an outlet of the printhead, and the second internal pump disposed at the second manifold, and wherein the second internal pump includes a second pump diaphragm that defines a wall of the second manifold, and a second actuator configured to displace the second pump diaphragm;

wherein the controlling the second internal pump comprises:

controlling the second actuator to retract the second pump diaphragm to draw the non-jetted print fluid from the flow-through jetting channels into the second manifold; and controlling the second actuator to extend the second pump diaphragm to discharge the non-jetted print fluid from the second manifold through the outlet.

9. The method of claim 8 wherein:

the controlling the first internal pump and the second internal pump comprises:

controlling the first actuator to extend the first pump diaphragm to discharge the print fluid from the first manifold to the flow-through jetting channels while controlling the second actuator to retract the second pump diaphragm to draw the non-jetted print fluid from the flow-through jetting channels into the second manifold.

10. The method of claim 9 wherein:

the controlling the second actuator to retract the second pump diaphragm comprises:

controlling the second actuator to retract the second pump diaphragm faster than the first actuator extends the first pump diaphragm.

11. The method of claim 8 wherein:

the controlling the first internal pump and the second internal pump comprises:

maintaining a negative pressure at nozzles of the flow-through jetting channels that is below a meniscus-breaking pressure.

12. The method of claim 8 further comprising:

controlling the first internal pump and the second internal pump to perform a purge of the printhead by:

controlling the first actuator to retract the first pump diaphragm, and the second actuator to retract the second pump diaphragm to draw the print fluid into the first manifold through the inlet; and controlling the first actuator to extend the first pump diaphragm, and the second actuator to extend the second diaphragm to force the print fluid out of nozzles of the flow-through jetting channels.

13. A printhead comprising:

a plurality of jetting channels;

a manifold internal to the printhead that is configured to convey a print fluid to the jetting channels; and at least one internal pump embedded in the printhead at the manifold to convey the print fluid through the manifold to the jetting channels;

wherein the at least one internal pump includes:

a pump diaphragm that defines a wall of the manifold; and an actuator configured to displace the pump diaphragm.

14. The printhead of claim 13 wherein:

the at least one internal pump comprises a plurality of internal pumps disposed at the manifold that are individually controlled.

15. The printhead of claim 13 wherein:

the actuator is configured to retract the pump diaphragm to draw the print fluid into the manifold through an inlet, and to extend the pump diaphragm to discharge the print fluid from the manifold to the jetting channels.

16. The printhead of claim 15 further comprising:

a valve disposed between the inlet and the at least one internal pump to restrict a backflow of the print fluid drawn into the manifold through the inlet.

17. The printhead of claim 15 further comprising:

valves disposed between the manifold and each of the jetting channels to restrict a backflow of the print fluid discharged from the manifold to the jetting channels.

18. The printhead of claim 13 wherein:

the wall of the manifold comprises a top wall opposite a plate stack of the printhead that forms the jetting channels.

19. The printhead of claim 13 wherein:

the manifold includes a longitudinal section disposed longitudinally within the printhead along a row of the jetting channels; and the pump diaphragm extends along at least a portion of a length of the longitudinal section.

20. A jetting apparatus comprising:

the printhead of claim 13.

* * * * *